United States Patent
Kim et al.

(10) Patent No.: US 11,985,451 B2
(45) Date of Patent: May 14, 2024

(54) LARGE-SCALE UNIFORM OPTICAL FOCUS ARRAY GENERATION WITH A PHASE SPATIAL LIGHT MODULATOR

(71) Applicants: President and Fellows of Harvard College, Cambridge, MA (US); Massachusetts Institute of Technology, Cambridge, MA (US)

(72) Inventors: Donggyu Kim, Cambridge, MA (US); Alexander Keesling Contreras, Boston, MA (US); Ahmed Omran, Somerville, MA (US); Harry Jay Levine, Cambridge, MA (US); Hannes Bernien, Somerville, MA (US); Mikhail D. Lukin, Cambridge, MA (US); Dirk R. Englund, Cambridge, MA (US)

(73) Assignees: President and Fellows of Harvard College, Cambridge, MA (US); Massachusetts Institute of Technology, Cambridge, MA (US)

( * ) Notice: Subject to any disclaimer, the term of this patent is extended or adjusted under 35 U.S.C. 154(b) by 499 days.

(21) Appl. No.: 17/432,723

(22) PCT Filed: Feb. 21, 2020

(86) PCT No.: PCT/US2020/019309
§ 371 (c)(1),
(2) Date: Aug. 20, 2021

(87) PCT Pub. No.: WO2020/172588
PCT Pub. Date: Aug. 27, 2020

(65) Prior Publication Data
US 2022/0060668 A1    Feb. 24, 2022

Related U.S. Application Data

(60) Provisional application No. 62/809,122, filed on Feb. 22, 2019.

(51) Int. Cl.
*H04N 9/31*      (2006.01)
*G03H 1/08*     (2006.01)

(52) U.S. Cl.
CPC ......... *H04N 9/3138* (2013.01); *G03H 1/0808* (2013.01); *H04N 9/3102* (2013.01);
(Continued)

(58) Field of Classification Search
CPC .... H04N 9/3138; H04N 9/3102; H04N 9/317; H04N 9/3197; G03H 1/0808; G03H 2001/0816
(Continued)

(56) References Cited

U.S. PATENT DOCUMENTS

| | | |
|---|---|---|
| 3,872,470 A | 3/1975 | Hoerz et al. |
| 4,479,199 A | 10/1984 | Friedlander et al. |

(Continued)

FOREIGN PATENT DOCUMENTS

| | | |
|---|---|---|
| CN | 106980178 A | 7/2017 |
| EP | 1171968 B1 | 11/2002 |

(Continued)

OTHER PUBLICATIONS

Jaksch et al., "The cold atom Hubbard toolbox," Arxiv, (30 pages) (2004).
(Continued)

*Primary Examiner* — William Choi
(74) *Attorney, Agent, or Firm* — Alexander Akhiezer; Erik A. Huestis; Foley Hoag LLP

(57) ABSTRACT

A method of generating uniform large-scale optical focus arrays (LOT As) with a phase spatial light modulator (SLM) includes identifying and removing undesired phase rotation in the iterative Fourier transform algorithm (IFTA), thereby producing computer-generated holograms of highly uniform LOT As using a reduced number of iterations as compared
(Continued)

to a weighted Gerchberg-Saxton algorithm. The method also enables a faster compensation of optical system-induced LOTA intensity inhomogeneity than the conventional IFTA.

24 Claims, 23 Drawing Sheets

(52) U.S. Cl.
CPC ........... *H04N 9/317* (2013.01); *H04N 9/3197* (2013.01); *G03H 2001/0816* (2013.01)

(58) Field of Classification Search
USPC ........................................................ 359/238
See application file for complete search history.

(56) References Cited

U.S. PATENT DOCUMENTS

| | | | |
|---|---|---|---|
| 5,684,621 | A | 11/1997 | Downing |
| 6,988,058 | B1 | 1/2006 | Sherwin et al. |
| 11,380,455 | B2 | 7/2022 | Keesling Contreras et al. |
| 11,710,579 | B2 | 7/2023 | Keesling Contreras et al. |
| 2002/0089718 | A1 | 7/2002 | Penninckx et al. |
| 2004/0000666 | A1 | 1/2004 | Lidar et al. |
| 2004/0017833 | A1 | 1/2004 | Cundiff et al. |
| 2004/0126114 | A1 | 7/2004 | Liu et al. |
| 2006/0225165 | A1 | 10/2006 | Maassen van den Brink et al. |
| 2007/0113012 | A1 | 5/2007 | Cable et al. |
| 2008/0116449 | A1 | 5/2008 | Macready et al. |
| 2008/0185576 | A1 | 8/2008 | Hollenberg et al. |
| 2008/0237579 | A1 | 10/2008 | Barker et al. |
| 2008/0313430 | A1 | 12/2008 | Bunyk |
| 2009/0204877 | A1 | 8/2009 | Betts |
| 2011/0238607 | A1 | 9/2011 | Coury et al. |
| 2014/0025926 | A1 | 1/2014 | Yao et al. |
| 2014/0200689 | A1 | 7/2014 | Utsunomiya et al. |
| 2014/0253987 | A1 | 9/2014 | Christmas |
| 2015/0317558 | A1 | 11/2015 | Adachi et al. |
| 2016/0064108 | A1 | 3/2016 | Saffman et al. |
| 2016/0125311 | A1 | 5/2016 | Fuechsle et al. |
| 2016/0328253 | A1 | 11/2016 | Majumdar |
| 2017/0300817 | A1 | 10/2017 | King et al. |
| 2018/0217629 | A1* | 8/2018 | MacFaden .............. G06E 3/003 |
| 2018/0218279 | A1 | 8/2018 | Lechner et al. |
| 2020/0185120 | A1 | 6/2020 | Keesling Contreras et al. |
| 2021/0279631 | A1 | 9/2021 | Pichler et al. |
| 2021/0365827 | A1 | 11/2021 | Monroe et al. |
| 2021/0383189 | A1 | 12/2021 | Cong et al. |
| 2022/0197102 | A1 | 6/2022 | Christen et al. |
| 2022/0293293 | A1 | 9/2022 | Contreras et al. |
| 2022/0391743 | A1 | 12/2022 | Wild et al. |

FOREIGN PATENT DOCUMENTS

| | | |
|---|---|---|
| EP | 3113084 A1 | 1/2017 |
| EP | 3438726 A1 | 2/2019 |
| GB | 0205011 A | 10/1923 |
| JP | 2007/233041 A | 9/2007 |
| JP | 2008/134450 A | 6/2008 |
| JP | 2008/158325 A | 7/2008 |
| JP | 2014-197733 A | 10/2014 |
| JP | 2017/078832 A | 4/2017 |
| WO | WO-2014/051886 A1 | 4/2014 |
| WO | WO-2019/014589 A1 | 1/2019 |
| WO | WO-2020/072981 A1 | 4/2020 |
| WO | WO-2020/172588 A1 | 8/2020 |
| WO | WO-2020/236574 A1 | 11/2020 |
| WO | WO-2021/007560 A1 | 1/2021 |
| WO | WO-2021/141918 A1 | 7/2021 |
| WO | WO-2022/132388 A2 | 6/2022 |
| WO | WO-2022/132389 A2 | 6/2022 |
| WO | WO-2022/174072 A1 | 8/2022 |
| WO | WO-2022/132388 A3 | 9/2022 |
| WO | WO-2022/132389 A3 | 9/2022 |
| WO | WO-2023/287503 A2 | 1/2023 |
| WO | WO-2023/287503 A3 | 1/2023 |
| WO | WO-2023/287503 A9 | 1/2023 |
| WO | WO-2023/080936 A2 | 5/2023 |
| WO | WO-2023/080936 A3 | 7/2023 |
| WO | WO-2023/132865 | 7/2023 |

OTHER PUBLICATIONS

Negretti et al., "Quantum computing implementation with neutral particles," Arxiv, (19 pages) (2011).
International Search Report and Written Opinion for International Application No. PCT/US2020/019309 dated Jul. 14, 2020.
Adachi et al., "Application of Quantum Annealing to Training of Deep Neural Networks," arXiv.org: 18 pages (2015).
Barredo et al., "An atom-by-atom assembler of defect-free arbitrary 2d atomic arrays," arXiv:1607.03042, Jul. 11, 2016, pp. 1-7.
Barredo et al., "An atom-by-atom assembler of defect-free arbitrary two-dimensional atomic arrays," Science, 354(6315): 1021-1023 (2016).
Barredo et al., "Synthetic three-dimensional atomic structures assembled atom by atom," Nature, 561: 79-82 (2018).
Baur et al., "Single-Photon Switch Based on Rydberg Blockade," Phys. Rev. Lett., 112: 073901 (2014).
Brion et al., "Quantum Computing with Collective Ensembles of Multilevel Systems," Phys. Rev. Lett., 99: 260501 (2007).
Browaeys et al., "Many-body physics with individually controlled Rydberg atoms," Nature Physics, 16: 132-142 (2020).
Bruzewicz et al., "Trapped-Ion Quantum Computing: Progress and Challenges," Applied Physics Reviews, 6(2): 021314 (2019).
Debnath et al., "Demonstration of a small programmable quantum computer with atomic qubits," Nature, 536(7614): 63-66 (2016).
Ebert et al., "Coherence and Rydberg Blockade of Atomic Ensemble Qubits," Phys. Rev. Lett., 115: 093601 (2015).
Endres et al., "Atom-by-atom assembly of defect-free one-dimensional cold atom arrays," Science, 354 (6315): 1024-1027 (2016).
Endres et al., "Cold Matter Assembled Atom-by-Atom," arXiv:1607.03044, Jul. 11, 2016, pp. 1-12.
Engstrom et al., "Calibration of spatial light modulators suffering from spatially varying phase response," Optics Express, 21(13): 16086-16103 (2013).
Extended European Search Report for EP Application No. EP 18831504 dated Mar. 30, 2021.
Farhi et al., "Classification with Quantum Neural Networks on Near Term Processors," arXiv:1802.06002, 1-21 (2018).
Fienup., "Phase retrieval algorithms: a comparison," Applied Optics 21(15): 2758-2769 (1982).
Fowler et al., "Surface codes: Towards practical large-scale quantum computation," Phys. Rev. A, 86: 032324 (2012).
Gerchberg et al., "A Practical Algorithm for the Determination of Phase from Image and Diffraction Plane Pictures," Optik, 35(2): 237-246 (1972).
Gorniaczyk et al., "Single-Photon Transistor Mediated by Interstate Rydberg Interactions," Phys. Rev. Lett., 113: 053601 (2014).
Gunter et al., "Interaction Enhanced Imaging of Individual Rydberg Atoms in Dense Gases," Phys. Rev. Lett., 108: 013002 (2012).
Gunter et al., "Observing the Dynamics of Dipole-Mediated Energy Transport by Interaction- Enhanced Imaging," Science, 342(6161): 954-956 (2013).
Haegeman et al., "Order Parameter for Symmetry-Protected Phases in One Dimension," Phys. Rev. Lett., 109(5): 050402-1-5 (2012).
Haldane, "Nonlinear Field Theory of Large-Spin Heisenberg Antiferromagnets: Semiclassically Quantized Solitons of the One-Dimensional Easy-Axis Neel State," Phys. Rev. Lett., 50(15):1153-1156 (1983).
International Search Report and Written Opinion for International Application No. PCT/US18/42080 dated Oct. 22, 2018.
International Search Report and Written Opinion for International Application No. PCT/US2019/049115 dated Jan. 7, 2020.
International Search Report and Written Opinion for International Application No. PCT/US2019/054831 dated Feb. 6, 2020.

(56) References Cited

OTHER PUBLICATIONS

International Search Report and Written Opinion for International Application No. PCT/US2020/033100 dated Sep. 2, 2020.
International Search Report and Written Opinion for International Application No. PCT/US2020/041709 dated Oct. 28, 2020.
International Search Report and Written Opinion for International Application No. PCT/US2021/012209 dated May 3, 2021.
Isenhower et al., "Demonstration of a neutral atom controlled-NOT quantum gate," arXiv:0907.5552, Nov. 24, 2009, pp. 1-5.
Jahromi et al., "Topological spin liquids in the ruby lattice with anisotropic Kitaev interactions," Physical Review B, 94(12): (10 pages) (2016).
Jahromi et al., "Topological $Z_2$ RVB quantum spin liquid on the ruby lattice," Physical Review B, 101(11): (10 pages) (2020).
Johnson et al., "Rabi Oscillations between Ground and Rydberg States with Dipole-Dipole Atomic Interactions," Physical Review Letters, 110(11): 113003-1-4 (2008).
Kaufman et al., "Hong-Ou-Mandel atom interferometry in tunnel-coupled optical tweezers," arXiv: 1312.7182, Jun. 17, 2014, pp. 1-17.
Labuhn et al., "Tunable two-demensional arrays of single Rydberg atoms for realizing quantum Ising models," Nature, 534(7609): 667-670 (2016).
Leonardo et al., "Computer generation of optimal holograms for optical trap arrays," Optics Express, 15(4): 1913-1922 (2007).
Lester et al., "Rapid production of uniformly-filled arrays of neutral atoms," arXiv:1506.04419, Jun. 14, 2015, pp. 1-5.
Lu et al., "Aluminum nitride integrated photonics platform for the ultraviolet to visible spectrum," Optics Express, 26(9): 11147 (2018).
Ma et al., "Generation of three-dimensional optical structures by dynamic holograms displayed on a twisted nematic liquid crystal display," Applied Physics B Lasers and Optics, 110(4): 531-537 (2013).
Matsumoto et al., "High-quality generation of a multispot pattern using a spatial light modulator with adaptive feedback," Optics Letters, 37(15): 3135-3137 (2012).
Mazurenko, "Optical Imaging of Rydberg Atoms," Thesis (S.B.)—Massachusetts Institute of Technology, Dept. of Physics (2012).
Mehta et al., "Towards fast and scalable trapped-ion quantum logic with integrated photonics," Proc. SPIE 10933, Advances in Photonics of Quantum Computing, Memory, and Communication XII, 109330B (2019).
Murmann et al., "Two Fermions in a Double Well: Exploring a Fundamental Building Block of the Hubbard Model," arXiv:1410.8784, Feb. 17, 2015, pp. 1-12.
Nogrette et al., "Single-Atom Trapping in Holographic 2D Arrays of Microtraps with Arbitrary Geometries," Physical Review X, 4: Article 021034 pp. 1-9 (2014).
Perez-Garcia et al., "PEPS as unique ground states of local Hamiltonians," Quant. Inf. Comp., 8: 0650 (2008).
Persson et al., "An algorithm for improved control of trap intensities in holographic optical tweezers," Proceedings of SPIE, 8458: 8 pages (2012).
Persson et al., "Minimizing intensity fluctuations in dynamic holographic optical tweezers by restricted phase change," Optics Express, 18(11): 11250-11263 (2010).
Persson et al., "Real-time generation of fully optimized holograms for optical trapping applications," Proceedings of SPIE, 8097: 10 pages (2011).
Persson et al., "Reducing the effect of pixel crosstalk in phase only spatial light modulators," Optics Express, 20(20): 22334-22343 (2012).
Persson., "Thesis for the Degree of Doctor of Philosophy: Advances in Holographic Optical Trapping," Department of Physics University o Gothenburg: 82 pages (2013).
Pichler et al., "Computational complexity of the Rydberg blockade in two dimensions," arXiv: 1809.04954 (2018).
Poland et al., "Development of a doubly weighted Gerchberg-Saxton algorithm for use in multibeam imaging applications," Optics Letters, 39(8): 2431-2434 (2014).
Pollmann et al., "Detection of symmetry-protected topological phases in one dimension," Phys. Rev. B, 86(12): 125441-1-13 (2012).
Prongue et al., "Optimized kinoform structures for highly efficient fan-out elements," Applied Optics, 31(26): 5706-5711 (1992).
Saffman et al., "Quantum information with Rydberg atoms," Rev. Mod. Phys., 82(3): 2313-2363 (2010).
Saffman et al., "Scaling the neutral-atom Rydberg gate quantum computer by collective encoding in holmium atoms," Phys. Rev. A, 78: 012336 (2008).
Shi, "Deutsch, Toffoli, and CNOT Gates via Rydberg Blockade of Neutral Atoms," arxiv.org, Cornell University Library, 201 Olin Library Cornell University Ithaca, NY (2018).
Shi, "Fast, Accurate, and Realizable Two-Qubit Entangling Gates by Quantum Interference in Detuned Rabi Cycles of Rydberg Atoms," arxiv.org, Cornell University Library, 201 Olin Library Cornell University Ithaca, NY (2019).
Sorace-Agaskar et al., "Multi-layer integrated photonics from the ultraviolet to the infrared," Proc. SPIE 10510, Frontiers in Biological Detection: From Nanosensors to Systems X, 105100D (2018).
Tamura et al., "Highly uniform holographic microtrap arrays for single atom trapping using a feedback optimization of in-trap fluorescence measurements," Optics Express, 24(8): 8132-8141 (2016).
Thimons et al., "Investigating the Gerchberg-Saxton Phase Retrieval Algorithm," SIAM: 11 pages (2018).
Torlai et al., "Integrating Neural Networks with a Quantum Simulator for State Reconstruction," Cornell University Library, (15 pages) (2019).
Urban et al., "Observation of Rydberg blockade between two atoms," Nature Physics, 5: 110-114 (2009).
Verresen et al., "One-dimensional symmetry protected topological phases and their transitions," Phys. Rev. B, 96(16): 165124-1-23 (2017).
Verstraete et al., "Criticality, the Area Law, and the Computational Power of Projected Entangled Pair States," Phys. Rev. Lett., 96: 220601 (2006).
Vidal, "Class of Quantum Many-Body States That Can Be Efficiently Simulated," Phys. Rev. Lett., 101(11): 110501-1-4 (2008).
Wang et al., "Coherent Addressing of Individual Neutral Atoms in a 3D Optical Lattice," Physical Review Letters, 115(4): 043003-1-5 (2015).
Yavuz et al., "Fast Ground State Manipulation of Neutral Atoms in Microscopic Optical Traps," Physical Review Letters, 96(6): 063001-1-4 (2006).
|Ying, "Entangled Many-Body States as Resources of Quantum Information Processing," Center for Quantum Technologies National University of Singapore (2013).
Zimmermann et al., "High-resolution imaging of ultracold fermions in microscopically tailored optical potentials," arXiv:1011.1004, Apr. 8, 2011, pp. 1-15.
Du et al., "Superconducting circuit probe for analog quantum simulators", *Physical Review A* 92(1): 012330 (2015).
International Search Report and Written Opinion for Application No. PCT/US2022/039189 dated Aug. 4, 2023.
International Search Report and Written Opinion for International Application No. PCT/US22/37325 dated Jun. 16, 2023.
Keating et al., "Adiabatic quantum computation with Rydberg-dressed atoms", Physical Review A 87, 052314, May 2013.
Levine, "Quantum Information Processing and Quantum Simulation with Programmable Rydberg Atom Arrays" The Department of Physics at Harvard University, PHD Thesis (2021).
Meschede, "Quantum engineering with neutral atoms one by one", *Conference on Lasers and Electro-Optics/Pacific Rim*. Optica Publishing Group, 2007.
Wang et al., "Quantum state manipulation of single-Cesium-atom qubit in a micro-optical trap", *Frontiers of Physics* 9: 634-639 (2014).

(56) References Cited

OTHER PUBLICATIONS

Willner et al., "Optics and photonics: Key enabling technologies", *Proceedings of the IEEE* 100.Special Centennial Issue: 1604-1643 (2012).
Aliferis et al., "Computation by measurements: A unifying picture," Arxiv: 13 pages (2004).
Anonymous., "Magneto-optical trap," Wikipedia, retrieved online <https://web.archive.org/web/20210125084412/https://en.wikipedia.org/wiki/Magneto-optical_trap>: 7 pages (2022).
Cong et al., "Quantum convolutional neural networks" Nature Physics, vol. 15, p. 1273-78 (2019).
Extended European Search Report for EP Application No. 19854402.5 dated May 9, 2022.
Extended European Search Report for EP Application No. 19868908.5 dated Jun. 13, 2022.
Grant et al., "Hierarchical quantum classifiers" ARXIV, p. 1-16 (2018).
International Search Report and Written Opinion for International Application No. PCT/US2022/016173 dated May 24, 2022.
Killoran et al., "Continuous-variable quantum neural networks" ARXIV, p. 1-21 (2018).
Kim and Swingle., "Robust entanglement renormalization on a noisy quantum computer" ARXIV, p. 1-17 (2017).
Morgado et al., "Quantum simulation and computing with Rydberg-interacting qubits," Arxiv, Cornell University Library: 36 pages (2020).
Tanasittikosol et al., "Microwave dressing of Rydberg dark states," Arxiv, Cornell University Library: 12 pages (2011).
Verdon et al., "A Universal Training Algorithm for Quantum Deep Learning" ARXIV, p. 1-83, (2018).
Wu et al., "Erasure conversion for fault-tolerant quantum computing in alkaline earth Rydberg atom arrays," arXiv.org: 16 pages (2022).
Auger et al., "Blueprint for fault-tolerant quantum computation with Rydberg atoms." Physical Review A 96(5): 052320 (2017).
Beugnon et al., "Two-dimensional transport and transfer of a single atomic qubit in optical tweezers" Nature Physics, vol. 3, p. 1-4 (2007).
Chao et al., "Fault-tolerant quantum computation with few qubits." npj Quantum Information 4.1 (2018): 42.
Cong et al., "Hardware-efficient, fault-tolerant quantum computation with Rydberg atoms", Physical Review X 12(2): 021049 (2022).
Couvert et al., "Optimal transport of ultracold atoms in the non-adiabatic regime" Europhysics Letters, 83: 5 pages (2008).
Dordevic et al., "Entanglement transport and a nanophotonic interface for atoms in optical tweezers" arXiv: 16 pages (2021).
Fowler et al., "Surface code quantum communication" arXiv, pp. 1-4 (2010).
Fowler et al., "Surface Codes: Towards practical large-scale quantum computation" Physical Review, vol. 86 (3), p. 1-54 (2012).
Graham et al., "Demonstration of multi-qubit entanglement and algorithms on a programmable neutral atom quantum computer" arXiv, p. 1-25 (2022).
Hashizume et al., "Deterministic Fast Scrambling with Neutral Atom Arrays" Physical Review Letters, vol. 126: 14 pages (2021).
International Search Report and Written Opinion for Application No. PCT/US2021/060136 dated Aug. 11, 2022.
International Search Report and Written Opinion for International Application No. PCT/US2022/031297 dated Feb. 21, 2023.
International Search Report and Written Opinion of Application No. PCT/US2021/060138 dated Aug. 19, 2022.
Kaufman et al., "Quantum thermalization through entanglement in an isolated many-body system" arXiv: 19 pages (2016).
Labuhn et al., "Realizing quantum Ising models in tunable two-dimensional arrays of single Rydberg atoms" arXiv: 1-12 (2016).
Lengwenus et al., "Coherent Transport of Atomic Quantum in a Scalable Shift Register" Physical Review Letters, 105: 4 pages (2010).
Low et al., "Practical trapped-ion protocols for universal qudit-based quantum computing", Physical Review Research 2(3): 033128 (2020).
Rehn et al., "A fractionalised "Z2" classical Heisenberg spin liquid" arXiv: 5 pages (2016).
Reichle et al., "Transport Dynamics of single ions in segmented microstructed Paul trap arrays" Forschritte der Physik Progress of Physics, 54 (8-10): 666-685 (2006).
Satzinger et al. "Realizing topologically ordered states on a quantum processor," 27 pages, (2021).
Savary et al., "Quantum Spin Liquids" arXiv: 60 pages (2016).
Yang et al., "Coherence Preservation of a Single Neutral Atom Qubit Transferred between Magic-Intensity Optical Traps" Physical Review Letter, 117: 6 pages (2016).
Yoder et al., "Universal fault-tolerant gates on concatenated stabilizer codes", Physical Review X 6(3): 031039 (2016).

\* cited by examiner

LARGE-SCALE UNIFORM OPTICAL FOCUS ARRAY GENERATION WITH A PHASE SPATIAL LIGHT MODULATOR

CROSS-REFERENCE TO RELATED APPLICATIONS

This application is the U.S. National Stage of International Application No. PCT/US2020/019309, filed Feb. 21, 2020, which claims the benefit of U.S. Provisional Application No. 62/809,122, filed Feb. 22, 2019, each of which is hereby incorporated by reference in its entirety.

STATEMENT OF GOVERNMENTAL INTEREST

This invention was made with Government support under 1125846 and 1506284 awarded by the National Science Foundation, and under N00014-15-1-2846 awarded by the Department of Defense Office of Naval Research. The Government has certain rights in this invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

BACKGROUND

Uniform optical focus arrays, which produce optical focus patterns with uniform intensity on an image plane, can be used in a range of applications, including wide-field laser-scanning microscopy, multi-focus multiphoton microscopy, and multi-beam laser machining. A number of approaches have been developed to produce optical focus arrays, including the use of micro-lens arrays, acousto-optic deflectors, amplitude spatial light modulators ("SLMs"), and phase SLMs. Among those, phase SLMs shift the phase of an incident light beam on a local scale, and these phase shifts result in interference patterns on the image plane.

Each pixel on the SLM is controlled by computer-generated input voltage sets to introduce the local relative phase shift. These input voltage sets can include, for example, 8-bit voltage sets for each pixel. When controlled with such an input voltage set, the resulting output from the SLM is a programmable phase pattern called a computer-generated hologram ("CGH") in which the applied voltage for each SLM pixel linearly induces relative phase delay on the incident wavefront. CGHs enable (i) generating focus array geometries and (ii) compensating for optical system imperfections in the resulting geometry. By contrast, amplitude SLMs operate by adjusting the amplitude of light, rather than its phase. Some available phase SLMs make more efficient use of optical power than available amplitude SLMs, which necessarily attenuate light passing therethrough. To determine the required phase pattern on phase SLMs to produce an optical focus array, algorithms such as iterative Fourier-transform algorithms ("IFTAs"), originally devised by Gerchberg and Saxton, can be used. These algorithms rely on Fourier-transforms and inverse Fourier-transforms to iteratively arrive at a computed CGH that will produce the target optical focus array pattern on the image plane. See R. D. Leonardo, F. Ianni, and G. Ruocco, *Computer generation of optimal holograms for optical trap arrays*, Opt. Express 15, 1913 (2007), which is hereby incorporated by reference in its entirety.

SUMMARY

In an example embodiment, the present disclosure provides a system comprising a computing node configured to: read a light source amplitude function, a target amplitude function, and a phase function; iteratively: perform a Fourier transform on the light source amplitude function and the phase function to produce a focal plane amplitude function and a focal plane phase function, calculate a corrected amplitude function based on the focal plane amplitude function and the target amplitude function, perform an inverse Fourier transform on the corrected amplitude function and the focal plane phase function to update the phase function until a phase-locking condition is satisfied in a first iterative process; retain the focal plane phase function as a locked phase function; and iteratively: perform a Fourier transform on the light source amplitude function and the phase function to produce a focal plane amplitude function and a focal plane phase function, calculate a corrected amplitude function based on the focal plane amplitude function and the target amplitude function, and perform an inverse Fourier transform on the corrected amplitude function and the locked phase function to update the phase function until a first halting condition is satisfied in a second iterative process.

In another example embodiment, the present disclosure provides a method comprising: reading a light source amplitude function, a target amplitude function, and a phase function; iteratively: performing a Fourier transform on the light source amplitude function and the phase function to produce a focal plane amplitude function and a focal plane phase function, calculating a corrected amplitude function based on the focal plane amplitude function and the target amplitude function, and performing an inverse Fourier transform on the corrected amplitude function and the focal plane phase function to update the phase function until a phase-locking condition is satisfied in a first iterative process; retaining the focal plane phase function as a locked phase function; and iteratively: performing a Fourier transform on the light source amplitude function and the phase function to produce a focal plane amplitude function and a focal plane phase function, calculating a corrected amplitude function based on the focal plane amplitude function and the target amplitude function, and performing an inverse Fourier transform on the corrected amplitude function and the locked phase function to update the phase function until a first halting condition is satisfied in a second iterative process.

In another example embodiment, the present disclosure provides a computer program product for optical focus array generation, the computer program product comprising a computer readable storage medium having program instructions embodied therewith, the program instructions executable by a processor to cause the processor to perform the methods disclosed herein.

The systems and methods described above have many advantages, such as a significantly reduced number of iterations required to determine CGHs of highly uniform LOFAs.

BRIEF DESCRIPTION OF THE FIGURES

Various objectives, features, and advantages of the disclosed subject matter can be more fully appreciated with reference to the following detailed description of the dis

DETAILED DESCRIPTION

According to some embodiments, the present disclosure describes methods and systems for generating uniform large-scale optical focus arrays ("LOFAs"). In some embodiments, "large-scale" can refer to a large number of optical foci, and "uniform" can refer to having uniform intensity across those foci. For example, a modified weighted Gerchberg-Saxton ("WGS") algorithm can be performed by locking the phase after a number of iterations based on satisfaction of a phase-locking condition. Identifying and removing undesired phase rotation in IFTA via locking the phase upon satisfaction of a phase-locking condition can rapidly produce CGHs for use, for example, in highly-uniform LOFAs. In some examples, faster compensation of system-induced LOFA intensity inhomogeneity can be also achieved over conventional IFTAs, such as the traditional WGS algorithm. Thus, the modification can enable rapid and reliable feedback to compensate for optical system imperfections and consequently generate uniform LOFAs. In some example implementations, after just three adaptive correction steps, LOFAs consisting of $\mathcal{O}(10^3)$ (on the order of 10) optical foci with >98% intensity uniformity have been produced.

Figure 1A:
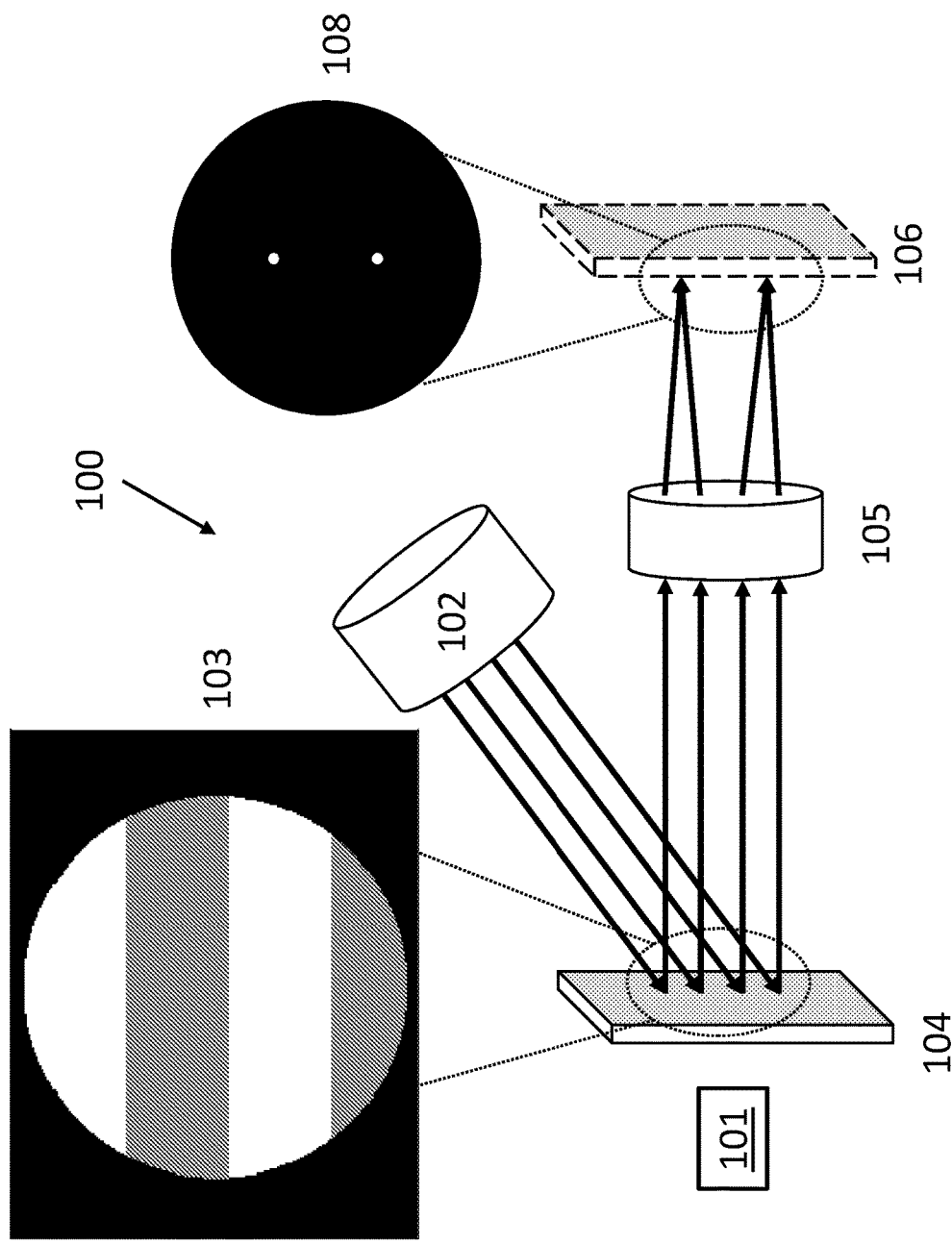
- FIGS. 1A-1E are representations of an exemplary optical system and modified weighted Gerchberg-Saxton algorithm, according to some embodiments.

FIG. 1A is a representation of a basic optical system 100 for an SLM 104, according to some embodiments. As shown in FIG. 1A, a light source 102 produces an incident beam of light on an SLM 104. The rays of light from the light source 102 may be spatially coherent in amplitude and phase. The SLM 104 reflects the incident light, based on an inputted CGH phase adjustment map 103 (e.g., a set of input voltages from a control station 101 with which to control the pixels of the SLM 104) that indicates phase adjustment as a function of position. Based on the inputted CGH phase adjustment map 103, the SLM 104 locally modulates (e.g., shifts) the phase of the incident light from the light source 102 by an amount equal to the local phase shift in the inputted CGH phase adjustment map 103. In other words, the function of the SLM 104 can be to adjust the phase of light from the light source 102, and the inputted CGH phase adjustment map 103 tells the SLM 104 how much to shift the phase of light at particular points in space. The phase shifted reflected light is then passed through a focusing lens 105. The SLM 104 is located at the back focal plane of the lens 105. The location where the light is reflected by the SLM 104 is referred to as the "back focal plane" of the lens 105, or sometimes as the x-plane. The SLM 104 modifies the light by changing its phase at particular locations in a two-dimensional pattern. This can be done, for example, by displaying a particular CGH pattern, $\Phi(x)$, on the SLM 104. Based on interference of the phase-modulated light, a particular pattern of light can be produced. In an example, the reflected light can be produced to match a target pattern having M optical foci at $u_m$ (m=1, 2, ..., M). Based on the properties of the light, after focusing by the lens 105, the system can produce patterns which appear on the image plane 106. In some embodiments, such as lower resolution applications, the optical system can be implemented without a lens 105 where the optical focus arrays are generated at far-field from the SLM. An expanded view of the image plane shows an exemplary pattern 108. As shown in FIG. 1A, the interference pattern 108 can have two peaks, which can be referred to as $u_1$ and $u_2$, centered on a vertical line. In some embodiments, image plane 106 with pattern 108 can be referred to as the "focal plane" of the lens 105 or the u-plane. Those of ordinary skill in the art would understand based on the present disclosure that a number of different optical elements or combinations of elements can be used to form the light source 102, and that various optical elements, such as, but not limited to, lenses, mirrors, and plates, can be positioned between one or more of the light source 102, SLM 104, lens 105, and image plane 106 to optimize the performance of the optical system. In addition, the lens 105 can comprise a series of lenses.

Prior to generating the pattern 108 on the image plane 106, a CGH phase adjustment map 103 should be calculated by control station 101 to be provided to the SLM 104. The CGH phase adjustment map 103, which can include instructions for controlling the voltage of the pixels on the SLM, can be designed to produce a pattern 108 that has an amplitude that closely matches a desired target amplitude pattern. An exemplary algorithm for producing a CGH phase adjustment map that produce desired target patterns when input into SLMs includes the WGS algorithm, which is explained in more detail below. One problem with existing algorithms like the WGS algorithm is that they take a long time to run to produce patterns when used with phase SLMs, in particular patterns consisting of a large number of optical foci with a high uniformity. Uniformity can refer to, in some examples, the degree of conformity of a projected pattern (e.g., pattern 108) with the target pattern. CGH phase adjustment maps that do not produce uniform patterns may have, for example, unwanted bright or dark spots that were not present in the target pattern, or a background/baseline level of brightness that is not in the target pattern. Uniformity can be measured using a number of different calculations or techniques. An exemplary calculation includes the average deviation in intensity from the target pattern across the entire image plane.

In some embodiments, existing algorithms can also or alternatively produce patterns with low efficiency. Efficiency can refer to the amount of light in the projected pattern 108 relative to that input to the SLM 104. For example, if 100% of the light input to the SLM 104 from the light source 102 was redirected to the pattern 108 on the image plane 106, the efficiency would be at 100%. Amplitude SLMs are less efficient than phase SLMs because they absorb incident light in order to produce a target pattern. However, projecting pattern 108 using phase SLMs is not perfectly efficient. A number of different calculations can be used to determine efficiency, such as, but not limited to:

efficiency =

$$\sum_{\text{foci in optical array}} \text{produced intensity} \div \sum_{\text{pixels}} \text{intensity of incident light}$$

Figure 1B:
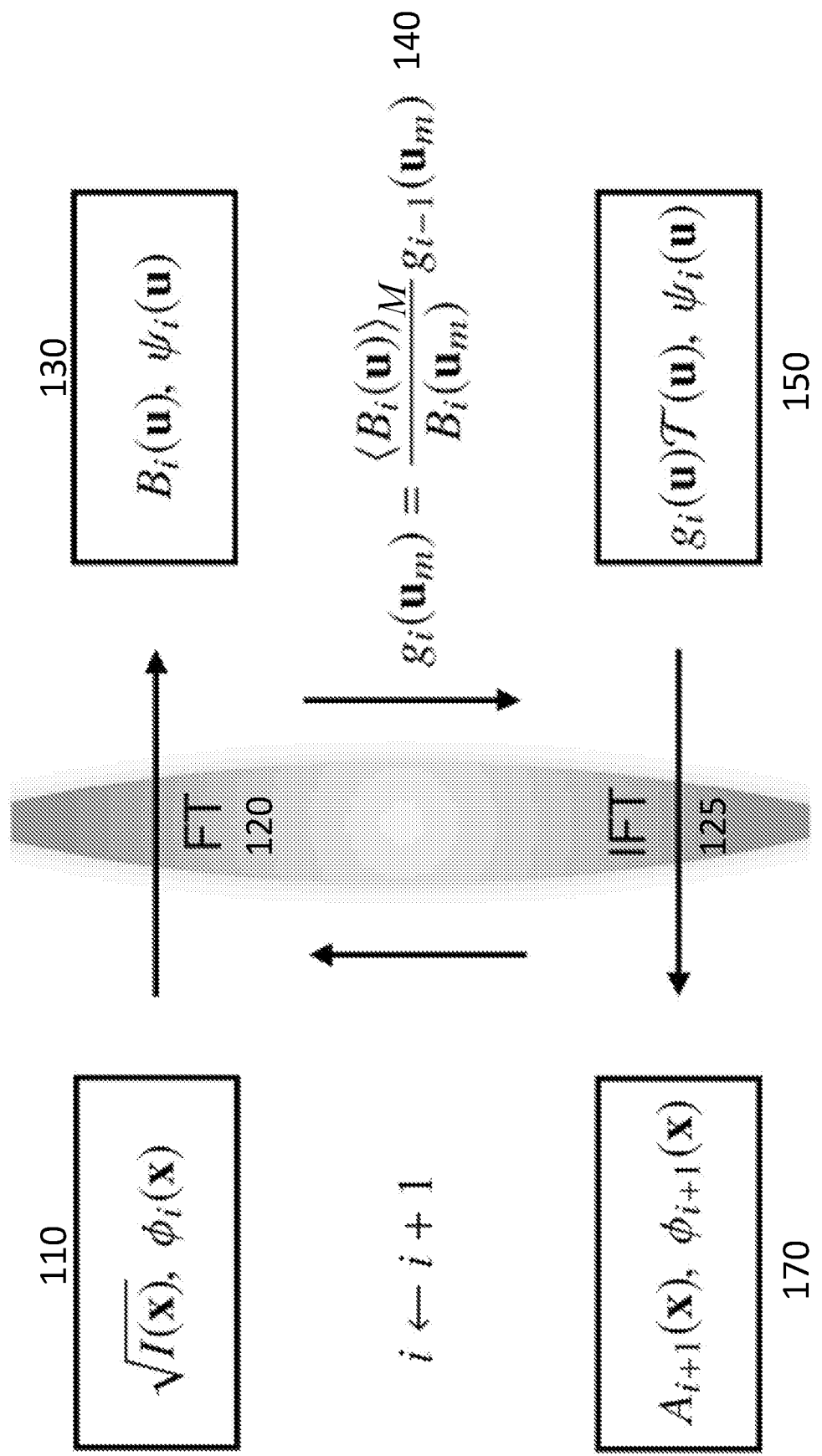

FIG. 1B is a representation of a traditional WGS algorithm, according to some embodiments. The modified WGS algorithm is designed to calculate a CGH phase adjustment map $\Phi(x)$ (sometimes referred to herein as a CGH 103) for displaying on the phase SLM 104 to produce an LOFA at the focal plane (u-plane) 106 of a focusing lens 105 with an amplitude that is based on a target amplitude pattern. In the example of FIG. 1B, the fixed incident intensity pattern from the light source 102 is denoted as $I(x)$, and the target LOFA amplitude (i.e., desired pattern 108) is denoted as $\mathcal{T}(u)$.

The traditional WGS algorithm obtains, after a number of iterations, a phase map $\phi_i(x)$ to use as the CGH phase adjustment map $\Phi(x)$ on the x-plane for controlling the SLM 104 to produce the target amplitude $\mathcal{T}(u)$ on the u-plane. Without wishing to be bound by theory, the algorithm operates similar to a simulation of the x-plane image in box 110 (e.g., incident light $I(x)$ from the light source 102 and the phase adjustments $\phi_i(x)$ on the SLM 104), the focusing lens 105 (in FIG. 1B, the Fourier transform 120), and the resulting amplitude and phase on the u-plane or image plane 106. In some embodiments, in steps or boxes 140, 150, 125, and 170, feedback can be developed that adjusts the simulated controls in box 110 to change the phase $\phi_i(x)$ on the simulated SLM 104 to better produce the desired pattern 108. After a number of iterations, the phase $\phi_i(x)$ is used to control a non-simulated SLM 104 so as to produce the desired pattern 108 on an actual image plane 106 through a non-simulated focusing lens 105.

The algorithm begins with box 110, which takes as an input amplitude and a phase. When calculating the initial CGH 103 for controlling the SLM 104 (rather than a correction for system-induced error as described in more detail below), the initial phase $\phi_i(x)$ of the algorithm can be chosen to be a random (or uniform) phase map uniformly distributed from $-\pi$ to $\pi$, while the amplitude can be chosen as $\sqrt{I(x)}$, where $I(x)$ represents an expected light input from the light source 102. In some embodiments, this light input is a two-dimensional Gaussian distribution.

During the i-th WGS iteration, the u-plane amplitude $B_i(u)$ and phase $\psi_i(u)$ in box 130 can be calculated from the x-plane amplitude $\sqrt{I(x)}$ and phase $\phi_i(x)$ using the two-dimensional Fourier transform (FT) 120. Next, a focus amplitude non-uniformity correction, $g_i(u_m)$, is calculated based on the formula 140 (shown below in the continuous u-plane domain):

$$g_i(u) = \left[\sum_m \frac{\langle B_i(u) \rangle_M}{B_i(u_m)} \delta(u - u_m)\right] \times g_{i-1}(u).$$

Here, $$\langle B_i(u) \rangle_M \doteq (1/M) \sum_{m=1}^{M} B_i(u_m),$$

$\delta(u)$ is the Dirac-$\delta$ function, and $g_0(u)=1$. Note that $g_i(u)$ includes information from the previous corrections $g_{i-1}(u)$, $g_{i-2}(u)$, . . . , $g_0(u)$ (in some embodiments, for the first iteration where i=0, $g_0(u)=1$ is used, and $B_0(u_m)$ is calculated by the Fourier transform). This focus amplitude non-uniformity correction $g_i(u)$ can be used to update $\phi_{i+1}(x)$ by relatively weighting the target $\mathcal{T}(u)$ by $g_i(u)$, as shown in box 150, to compensate for irregularities in $B_i(u_m)$. In particular, as shown in box 150, while the phase $\psi_i(u)$ is kept fixed moving from box 130 to box 150, the u-plane amplitude $B_i(u)$ is ignored, and instead replaced by the target amplitude $\mathcal{T}(u)$ multiplied by the focus amplitude non-uniformity correction $g_i(u)$. In this way, the amplitude value fed back into the algorithm is updated based on the target amplitude $\mathcal{T}(u)$ and the inhomogeneities in the u-plane amplitude $B_i(u_m)$ (as corrected by the focus amplitude non-uniformity correction $g_i(u)$).

Next, the corresponding x-plane amplitude $A_{i+1}(x)$ and phase $\phi_{i+1}(x)$ in box 170 are computed by the inverse two-dimensional FT ("IFT") 125 performed on the corrected u-plane amplitude, $g_i(u)\mathcal{T}(u)$, and the uncorrected u-plane phase, $\psi_i(u)$, from box 150. In this way, the feedback 150 from the u-plane into the IFT 125 includes information about the target amplitude, $\mathcal{T}(u)$, which is corrected by $g_i(u)$, and the updated phase, $\psi_i(u)$. Finally, the resulting amplitude $A_{i+1}(x)$ from IFT 125 in box 170 is discarded, while the phase $\phi_{i+1}(x)$ in box 170 is used in box 110 for the next iteration of the algorithm. In some embodiments, in this way, at each iteration, the phase $\phi_i(x)$ is updated on the x-plane while the amplitude is not. This is because the exemplary phase SLM 104 only adjusts the phase of the reflected light on the x-plane, and does not directly control the amplitude. The algorithm may terminate on a variety of different conditions, for example, after a desired uniformity, efficiency, number of iterations, or combination thereof has been reached. Upon termination, the phase $\phi_i(x)$ can be used as the CGH $\Phi(x)$.

Figure 1C:
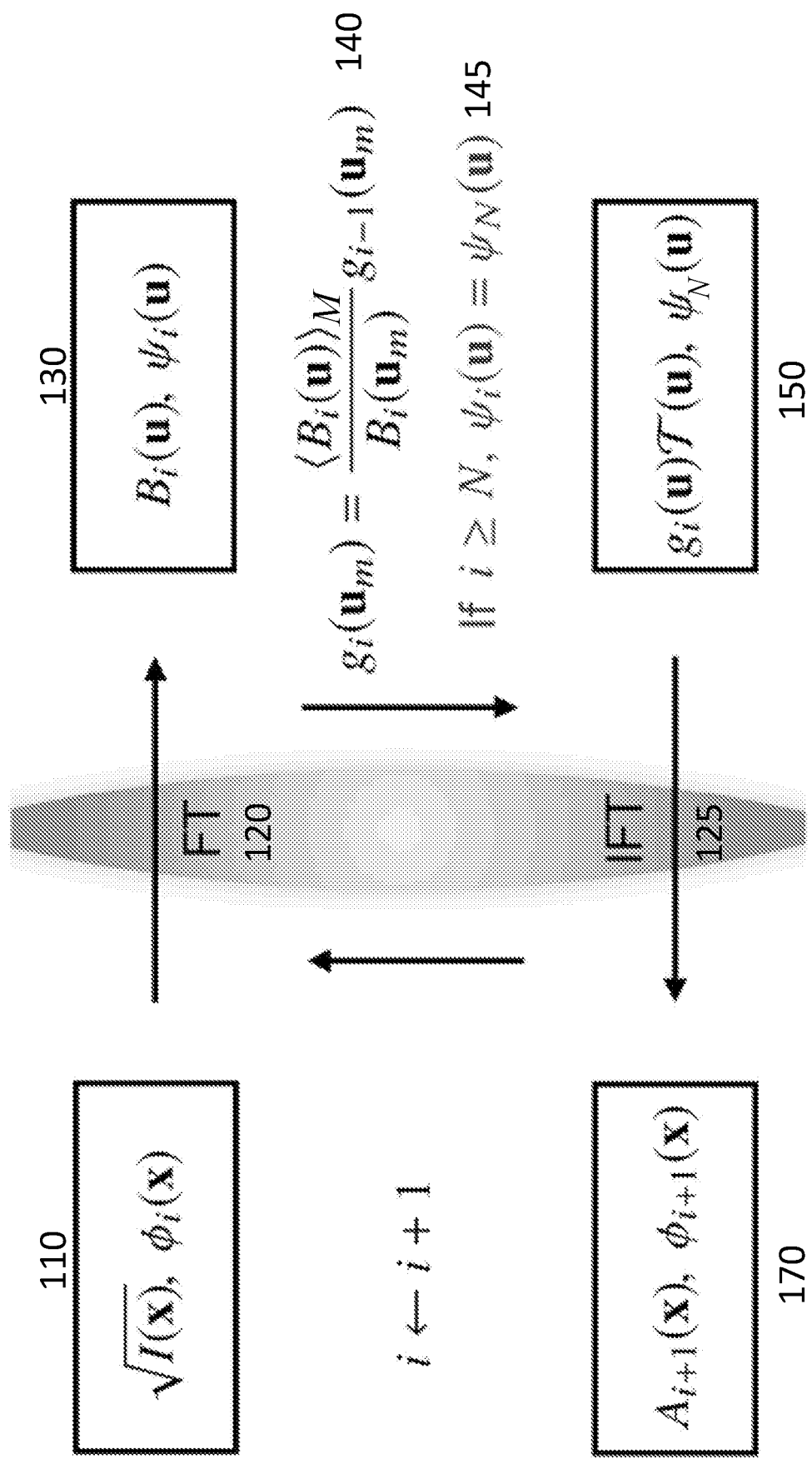
Figure 1E:
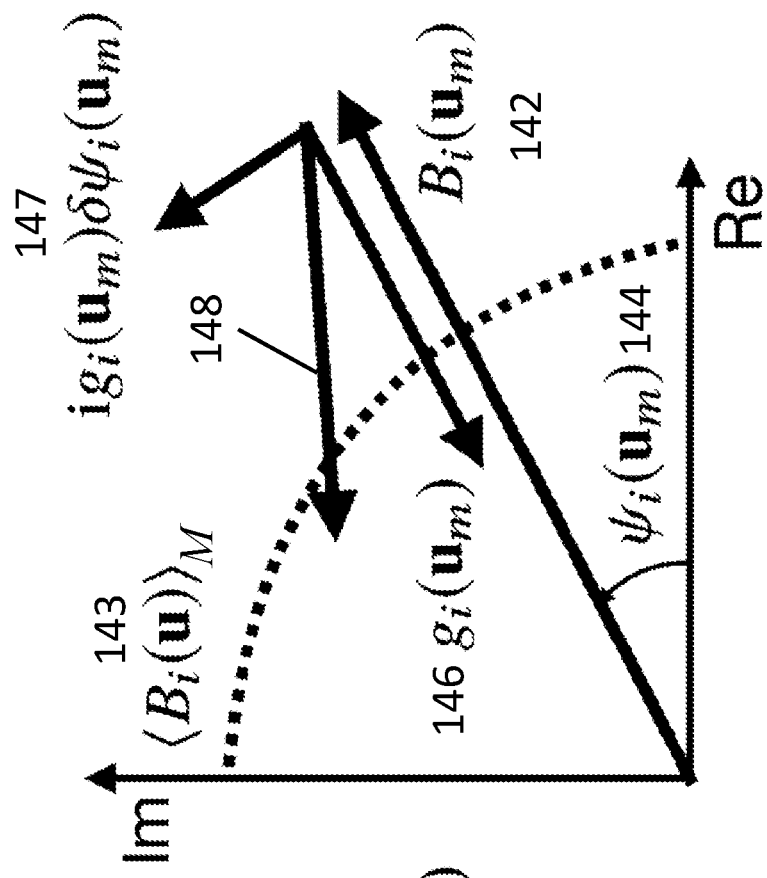
Figure 1D:
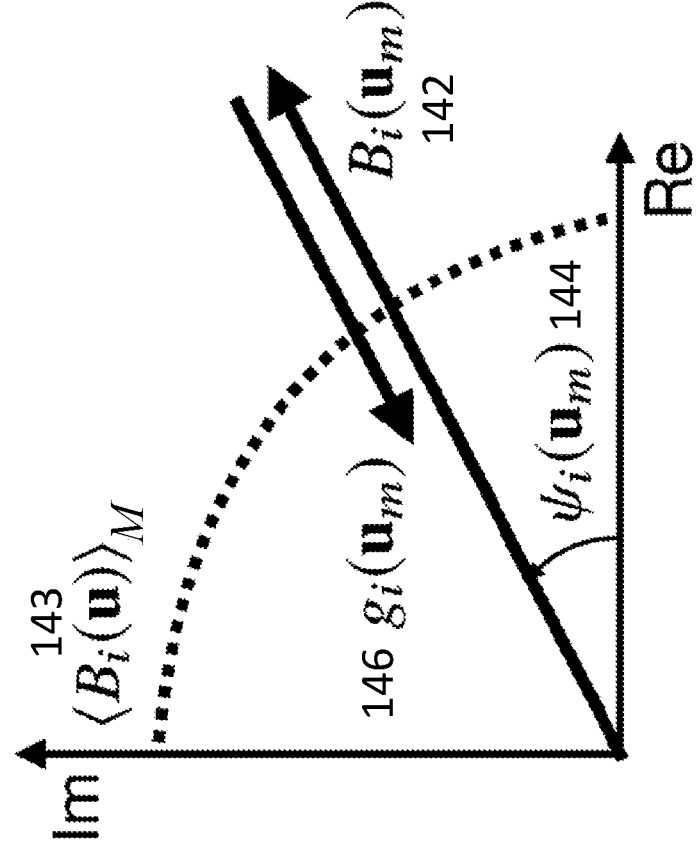

FIGS. 1D and 1E are graphs showing the real ("Re") and imaginary ("Im") components of the complex field phasor of an optical focus in a LOFA, according to some embodiments. FIGS. 1D and 1E, show the amplitude $B_i(u_m)$ 142 and phase $\psi_i(u_m)$ 144 of the complex field phasor along with its amplitude correction factor $g_i(u_m)$ 146. Without wishing to be bound by theory, FIG. 1D shows the best-case scenario where $g_i(u_m)$ 146 compensates for the non-uniformity of the $B_i(u_m)$ 142 phasor amplitude (compared to the mean amplitude $\langle B_i(u) \rangle_M$ 143 shown in the dashed line). However, as shown in FIG. 1E, replacing $A(x)$ with $\sqrt{I(x)}$ induces a random phase $\delta\psi_i(u_m)$ on the phasor. This random phase reduces the effect of the amplitude correction factor $g_i(u_m)$ 146 at least in part because the correction phasor $g_i(u_m)[1+i\delta\psi_i(u_m)]$ 148 points away from $g_i(u_m)$ 146 with an amplitude different from $g_i(u_m)$ 146, as shown in FIG. 1E, during the iteration for the CGH calculation. This effect has been ignored in the conventional WGS algorithm, as explained in more detail below. This random phase can also make the adaptive CGH correction less effective, since it can introduce additional non-uniformity of the LOFA in practice (for example, as recorded by a camera). This effect is described in more detail with reference to FIG. 4 below.

As discussed above, the WGS algorithm, which completes multiple iterations of $\phi_i(x)$-calculations has made it possible to find a CGH $\Phi(x)$ 103 for a highly-uniform large-scale optical focus array. However, substituting the amplitude $A_{i+1}(x)$ with $\sqrt{I(x)}$ in each subsequent WGS iteration can make $g_i(u)$ less effective for one or more reasons. In a first exemplary reason, and without wishing to be bound by theory, in the Fourier-transform relation $\mathcal{F}[A_{i+1}(x)e^{i\phi_{i+1}(x)}]=g_i(u)\mathcal{T}(u)e^{i\psi_i(u)}$ in FIG. 1B, the amplitude substitution of $\sqrt{I(x)}$ for $A_{i+1}(x)$ can introduce a change $\delta\psi_i(u)$ in phase which is relatively large compared to a change $\delta g_i(u)$ in amplitude. In other words, phase changes at each iteration become the significant driver of changes in the values computed by the algorithm. Thus, $\mathcal{F}[\sqrt{I(x)}e^{i\varphi_{i+1}(x)}] \approx g_i(u)\mathcal{T}(u)e^{i[\psi_i(u)+\delta\psi_i(u)]} \approx \mathcal{F}[A_{i+1}(x)e^{i\varphi_{i+1}(x)}](1+i\delta\psi_i(u))$.

This phase change $\delta\psi_i(u)$ can make $g_i(u)$ less effective, because $\delta\psi_i(u)$ introduces additional non-uniformity in $B_{i+1}(u_m)$ that is unaccounted for in the calculation of $g_i(u)$, and this unaccounted-for effect is accumulated during the iterations through the memory in $g_i(u)$.

Accordingly, in some embodiments, the WGS algorithm can be modified to remove the undesired phase change $\delta\psi_i(u)$. Embodiments of this modified WGS algorithm are shown in FIG. 1C, where similar steps are designated with similar reference numerals as those in FIG. 1B. As described in more detail below, an embodiment of the modification to the traditional WGS algorithm takes the form of imposing the adjustment shown in step 145 in FIG. 1C after a number of iterations through the traditional WGS algorithm shown in FIG. 1B. This step 145 can be referred to as a "phase lock," whereby $\psi_i(u)$ in box 150 is locked at $\psi_N(u)$ from iteration N onward.

Though $\delta\psi_i(u)$ in some embodiments comes from the fixed laser intensity pattern, this phase change can be reflected in a subsequent i+1-th iteration (i.e., $\psi_{i+1}(u)=\psi_i(u)+\delta\psi_i(u)$). After an initial number of WGS iterations of N to reach a high modulation efficiency, some embodiments of the present disclosure remove $\delta\psi_i(u)$ (i.e., $\delta\psi_i(u)=0$) in i≥N by fixing $\psi_i(u)$ to $\psi_N(u)$ as shown at 145, which can reduce the number of iterations to achieve a target LOFA uniformity. In other words, after i=N iterations, the phase $\psi_i(u)$ is locked to be $\psi_N(u)$ for each subsequent iteration such that in box 150 only the value of the amplitude $g_i(u)\mathcal{T}(u)$ is adjusted while $\psi_i(u)$ is held constant at $\psi_i(u)=\psi_N(u)$, and, therefore, $\psi_i(u)-\psi_N(u)=\delta\psi_i(u)=0$ for i>N. Note that the adjusted amplitude $g_i(u)\mathcal{T}(u)$ updates on both the x-plane amplitude $A_{i+1}(x)$ and phase $\phi_{i+1}(x)$ in the box 170 by the inverse Fourier transform (the step 125). This is because the inverse Fourier transform (and Fourier transform) is a complex kernel that maps an input complex function to another complex function. In this way, the modified WGS algorithm can be considered a phase-locked WGS algorithm in that it locks the phase feedback in the u-plane after N iterations. The number of iterations N be selected based on one or more phase-locking conditions, examples of which are described in more detail below.

According to some embodiments, the phase-locking condition that determines the number of iterations, N, can be selected by an operator of a computer running the algorithm. For example, a graphical user interface (GUI) can prompt the user for a number of iterations N before phase-locking (i.e., the condition 145 in FIG. 1C) will occur, and the user can enter a desired number. In some embodiments, N is selected based on one or more of (i) the number of foci to produce, (ii) the number of SLM pixels, (iii) optical focus array geometry, and (iv) target uniformity. For example, the phase-locking condition that determines the number of iterations, N, can be selected based on a threshold uniformity and/or efficiency. For example, one or more of a uniformity and the efficiency of the amplitude $B_i(u_m)$ on the u-plane can be calculated at each iteration. Once the calculated uniformity, efficiency, and/or both have reached a threshold value, the phase can be locked for subsequent iterations. In other words, the algorithm may require that only one of uniformity or efficiency, both uniformity and efficiency, or either uniformity or efficiency meet a respective threshold value. The threshold value for the uniformity may depend on the calculated efficiency and/or the threshold value for the efficiency may depend on the calculated value for the uniformity. The threshold values for the uniformity and/or efficiency can be set based on empirical studies of the performance of the modified WGS algorithm, or can be input as desired values by a user. The threshold values may be dynamic based on input criteria from an operator of the algorithm. For example, a GUI can include a dial, sliding scale, or other type of input that indicates a desired run-time value based on a run-time scale. Based on preset (e.g. empirical) data, the threshold value for the uniformity and/or efficiency can be selected based on the input value. According to some embodiments, a threshold efficiency to be used alone or in combination with a threshold uniformity can be 70%, 75%, 80%, 85%, 88%, 90%, 91%, 92%, or 93%. According to some embodiments, a threshold uniformity to be used alone or in combination with a threshold efficiency can be 90%, 91%, 92%, 93%, 94%, 95%, 96%, 97%, 97.5%, 98%, 98.5%, 99%, 99.1%, 99.2%, 99.3%, 99.4%, 99.5%, 99.6%, 99.7%, 99.8%, 99.85%, or 99.9%. Different thresholds can be used for different target patterns, such as random vs. ordered patterns. A person having ordinary skill in the art would understand from the present disclosure that the above-listed phase-locking conditions are merely exemplary and are non-limiting. Additional or alternative conditions are contemplated and can be applied in the modified WGS algorithm.

Exemplary Implementations

Figure 2A:
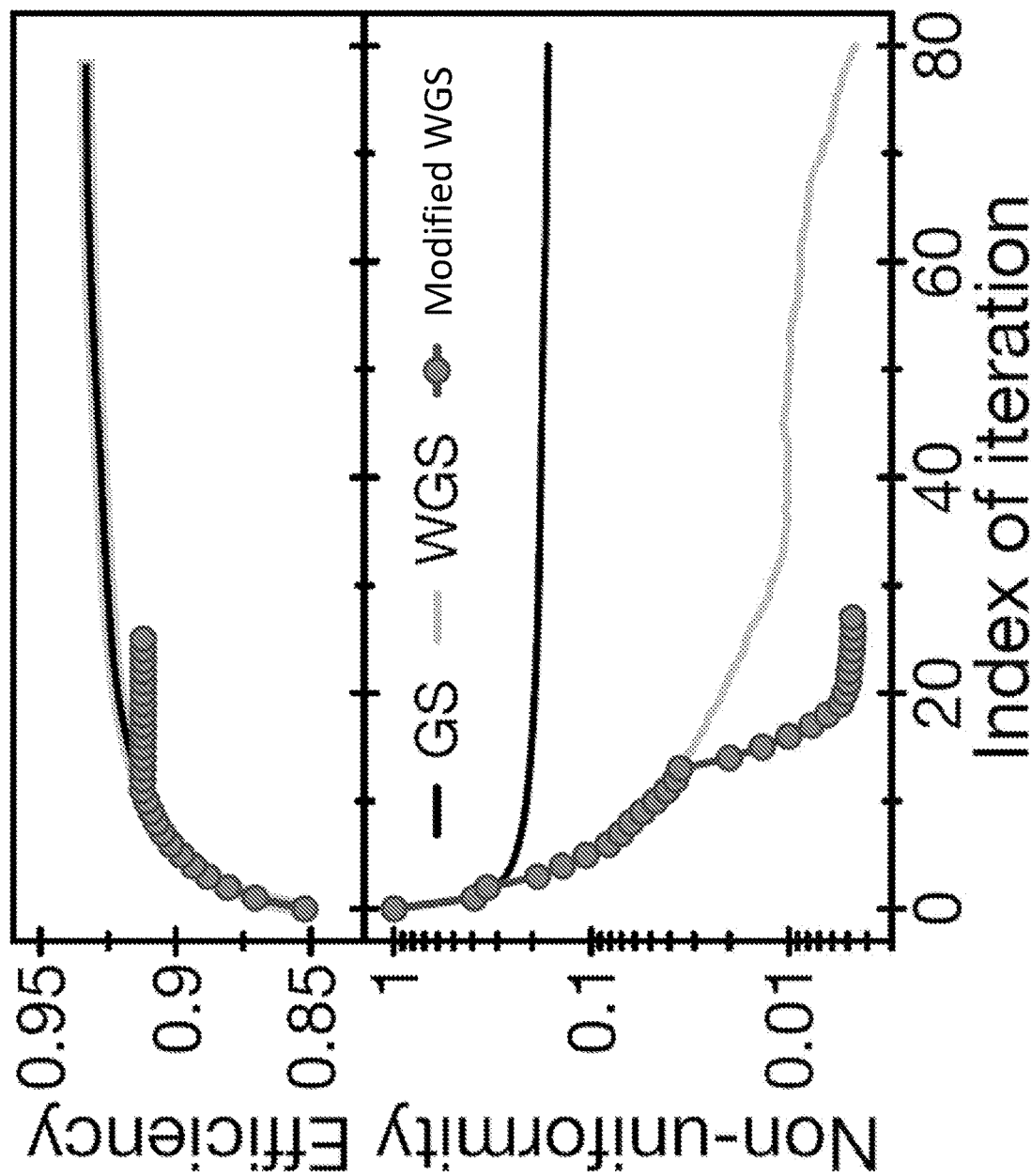
FIGS. 2A-2F show example CGH calculations and comparisons between modified and traditional weighted Gerchberg-Saxton algorithms, according to some embodiments.

FIG. 2A plots the performance of example implementations of the phase-fixed modified WGS algorithm used to generate an exemplary LOFA geometry. The non-weighted GS algorithm is shown as a solid black line, the WGS as a shaded line, and the modified WGS with dots. In the exemplary modified WGS algorithm, the number of iterations before phase-locking was set at 12. The top pane of FIG. 2A plots the resulting efficiency (as measured, for example, using the formula discussed above) of each algorithm as a function of the number of iterations. The bottom pane of FIG. 2A shows the non-uniformity of each algorithm as a function of the number of iterations. As shown in FIG. 2A, the modified WGS algorithm achieves a lower non-uniformity more quickly than the WGS algorithm. In the example of FIG. 2A, a uniformity of 0.995 is achieved with 26 (80) iterations for the modified WGS algorithm (the conventional WGS algorithm).

Figure 2B:
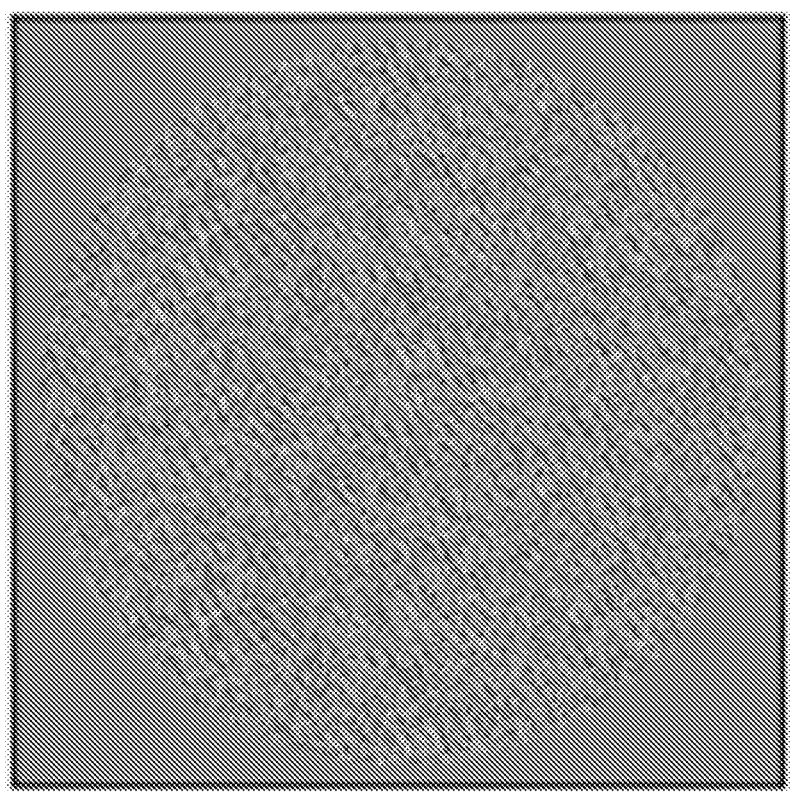
Figure 2B:
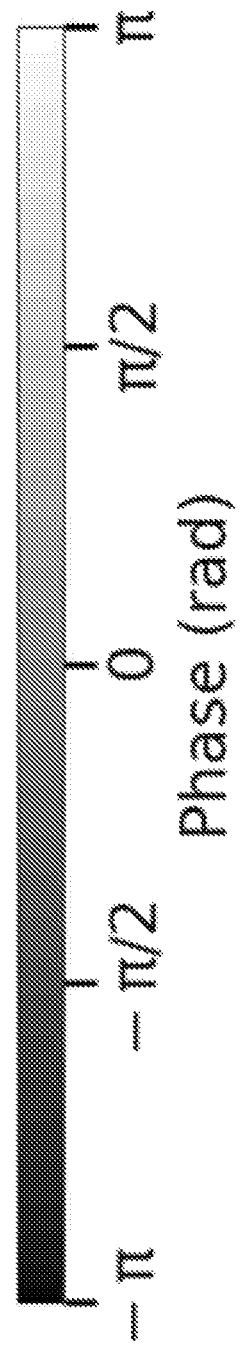
Figure 2C:
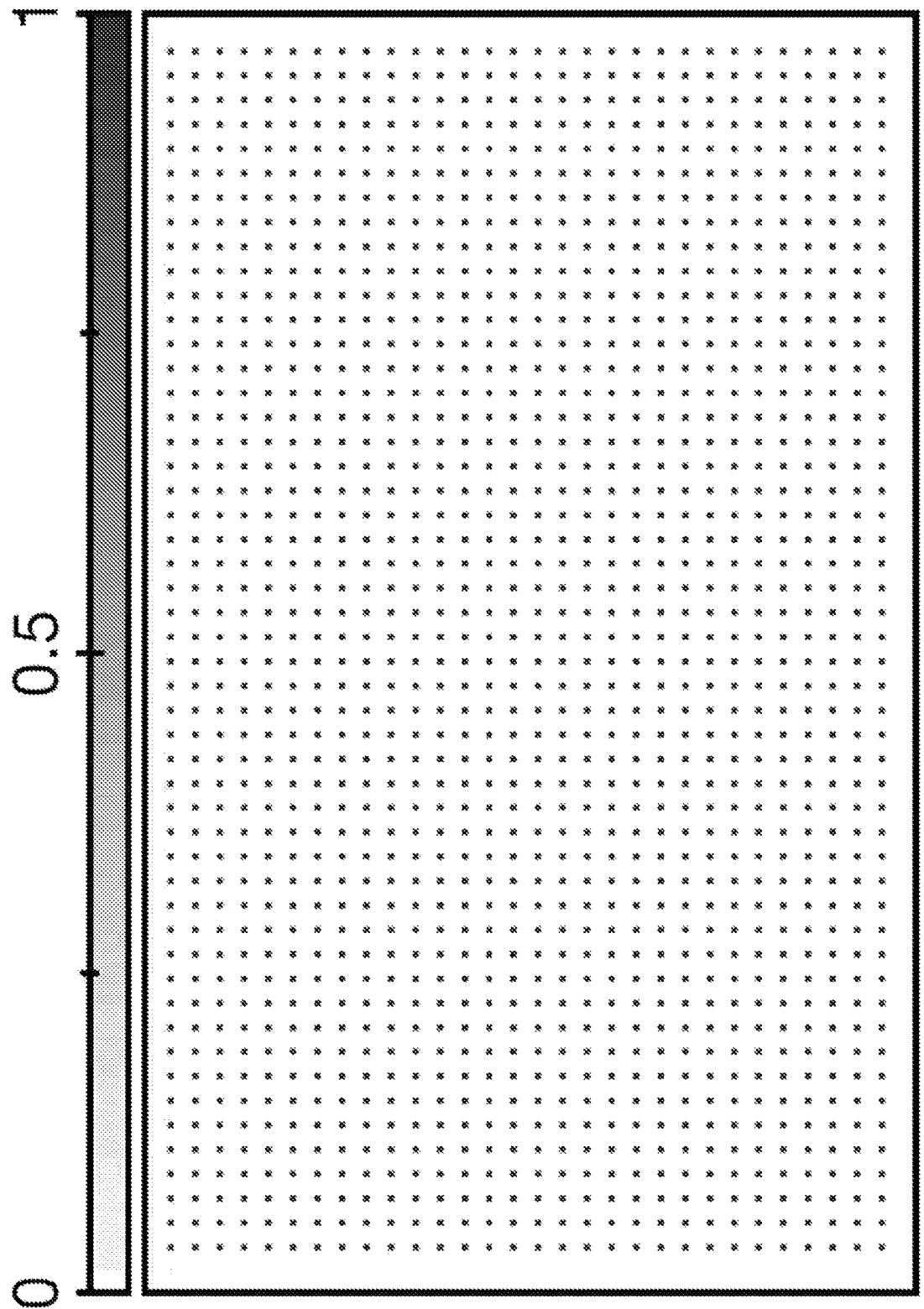

FIG. 2B shows a CGH $\Phi(x)$ calculated using the modified WGS algorithm discussed with reference to FIG. 2A superimposed with a phase, such as $t(x)=e^{2\pi i x/\Lambda}$ to spatially separate the unmodulated zeroth order (e.g., non-modulated portion based on the imperfect modulation efficiency of SLMs) in the experiment, according to some embodiments. In other words, to spatially separate such unmodulated part from the desired target intensity pattern, a phase ramp is multiplied by $\Phi(x)$. FIG. 2C shows a LOFA at the u-plane (e.g., image plane 106 in FIG. 1A) produced with the CGH shown in FIG. 2B as it would appear using an ideal SLM and optical system.

Figure 2D:
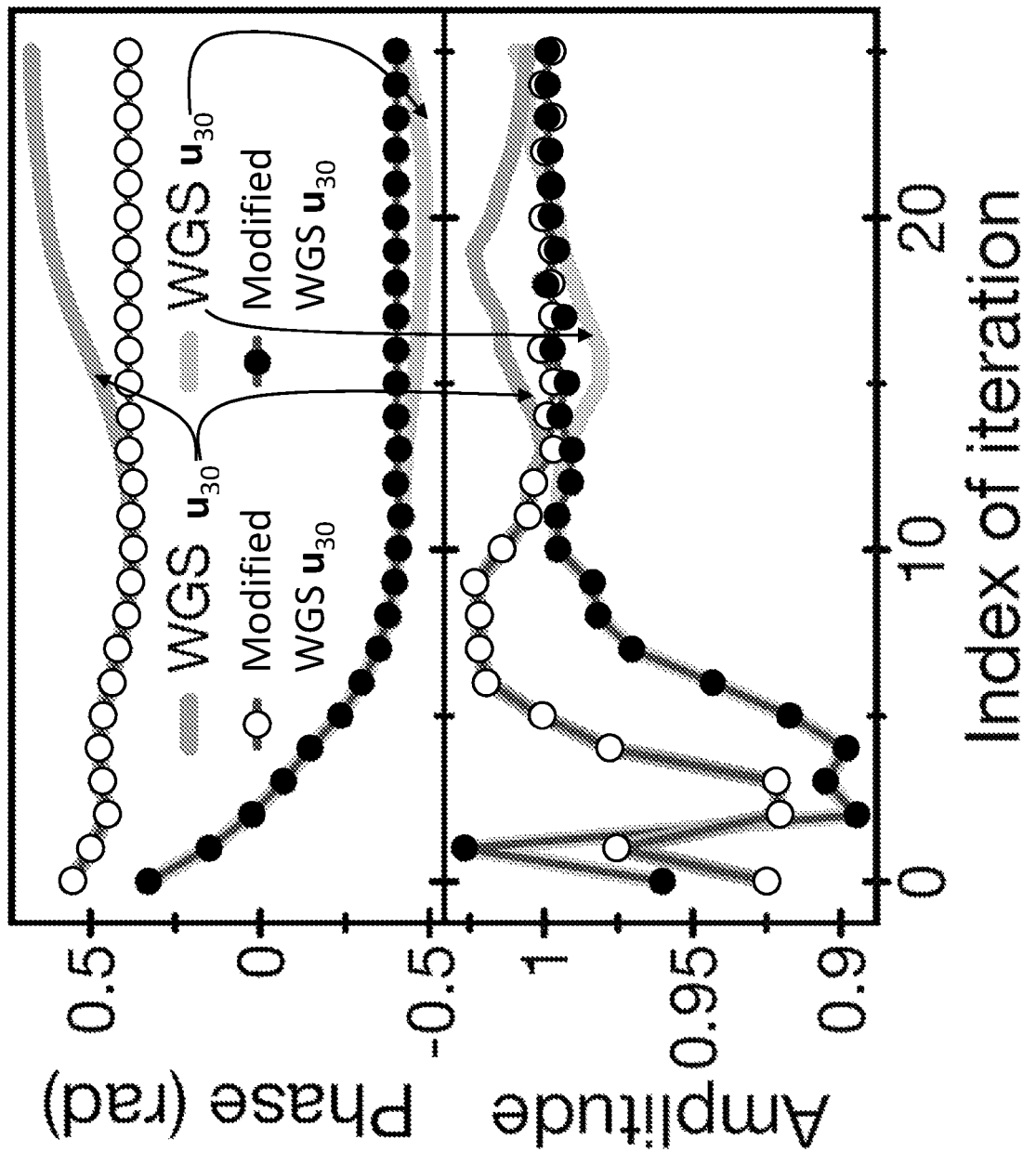

FIG. 2D is a graph showing the phase in radians (top pane) and amplitude (bottom pane) progress of optical foci as a function of the index of iteration at $u_{30}$ and $u_{100}$ during exemplary iterative CGH calculation. FIG. 2D shows how the phase and amplitude of optical foci change over the course of 30 iterations.

Figure 2E:
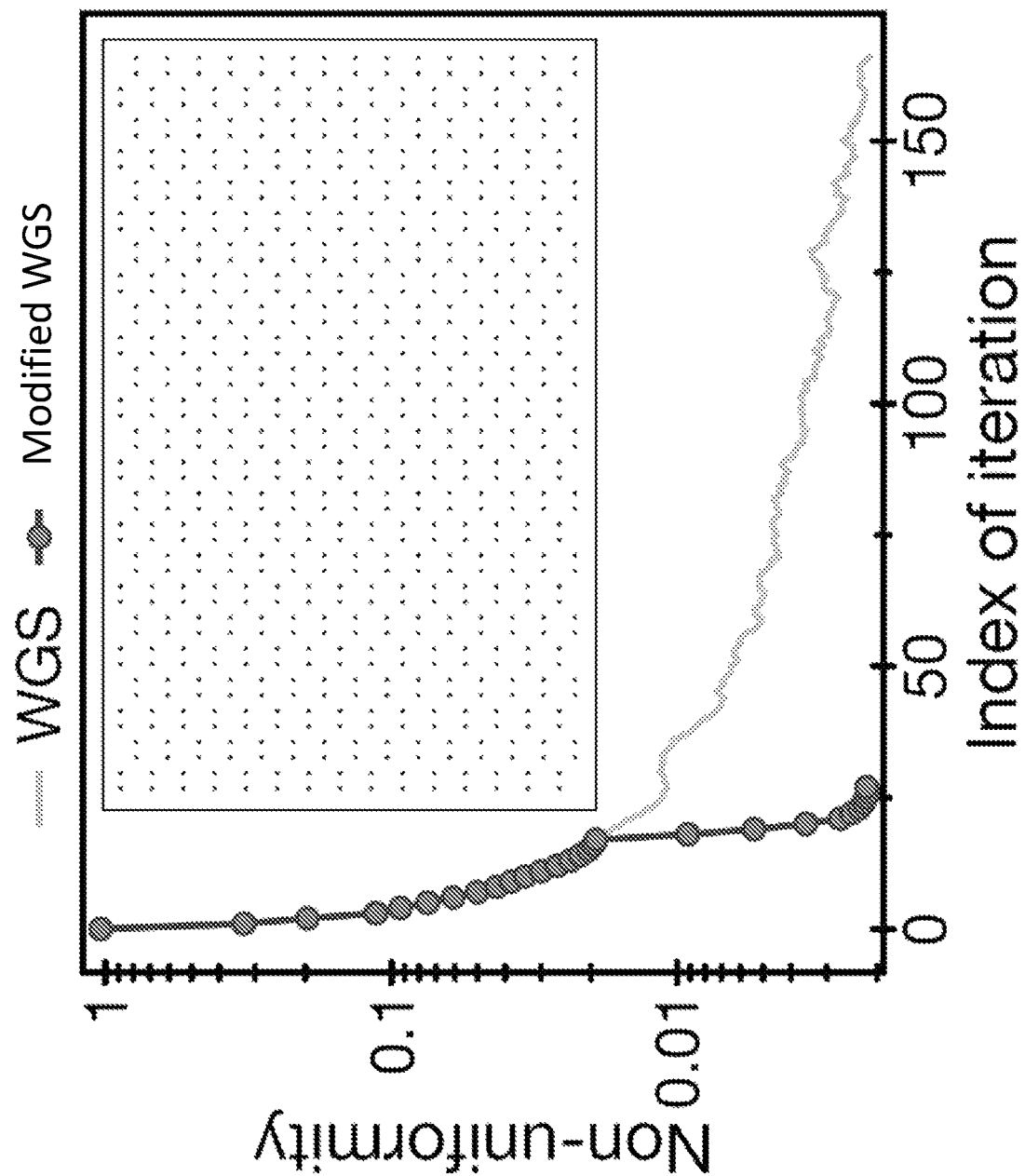
Figure 2F:
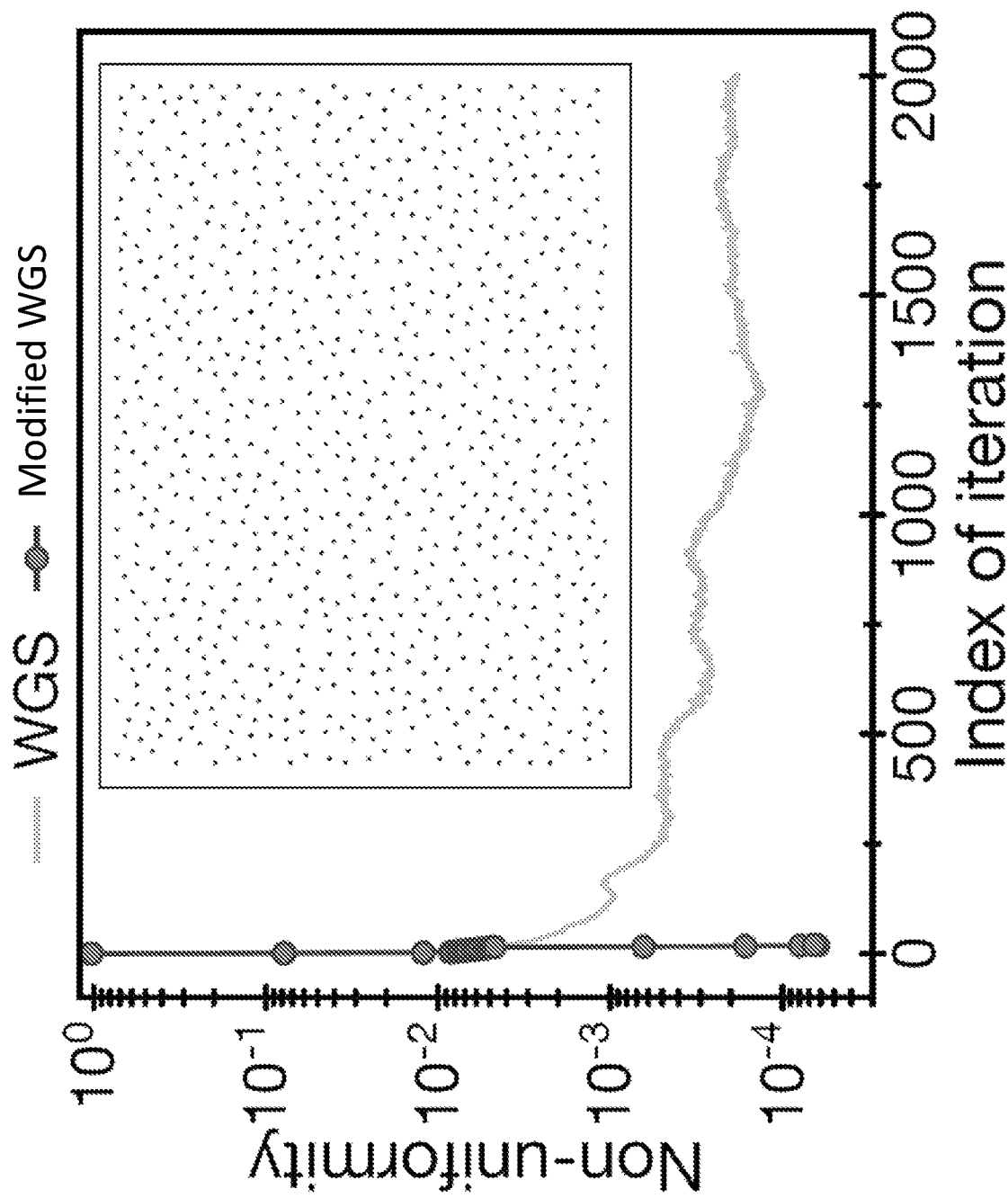

FIGS. 2E and 2F are graphs showing comparisons between the WGS and modified WGS algorithms for exemplary hexagonal lattice and random/disordered optical focus arrays, respectively, each of which are superimposed over the graphs. In particular, each graph shows the non-uniformity as a function of the index of iteration. As shown in FIGS. 2E and 2F, the modified WGS algorithm reaches a low non-uniformity far quicker than the traditional WGS algorithm for both the hexagonal lattice and disordered optical focus arrays, respectively. In addition, for both examples, the modified WGS algorithm reaches a lower non-uniformity than the WGS algorithm even after more than three times as many iterations.

Adaptive CGH Correction

In some embodiments, SLMs displaying the CGH determined from IFTAs do not produce the expected highly-uniform LOFAs, and instead present inhomogeneity in the optical focus intensity. This inhomogeneity can be caused, for example, by imperfections in the optical setups and SLMs. For example, non-uniform light from the light source 102, or inconsistencies in the focusing lens 105 can produce inhomogeneities from the target pattern. Furthermore, the SLM 104 itself may present some inconsistencies during operation. Thus, according to some embodiments, non-uniformity such as, but not limited to this system-induced non-uniformity can be removed by adaptively correcting the CGH determined from IFTAs by a similar technique to that discussed above. As described in more detail below, the technique can be applied to identify adaptive CGH corrections to compensate for the observed non-uniformity.

According to some embodiments, an imaging device such as a CMOS camera can be placed at the image plane 106 from FIG. 1A. This camera can be used to record spatially resolved images of the amplitude of the light on the image plane 106 from the CGH $\Phi^{(j)}(x)$ 103 generated, for example, using the techniques described above.

According to some embodiments, the compensation technique begins at box 110 in FIG. 1C, where the arbitrary phase $\phi_i(x)$ can be replaced with the CGH phase $\Phi(x)$ 103 used to generate the recorded pattern. The intensity I(x) is unchanged. Without wishing to be bound by theory, the initial CGH phase $\Phi(x)$ 103 can be denoted as $\Phi^{(0)}(x)$ (without adaptive correction). In finding the j-th corrected CGH $\Phi^{(j)}(x)$ 103, the CMOS camera records the LOFA pattern produced by $\Phi^{(j-1)}(x)$ 103. Based on the recorded focus intensity $I^{(j-1)}(u_m)$ on the u-plane, the target amplitude $\mathcal{T}^{(j)}(u)$ ( $\mathcal{T}(u)$ in FIG. 1C) can be adjusted to compensate for the intensity irregularities in $I^{(j-1)}(u_m)$ using the following formula:

$$\mathcal{T}^{(j)}(u) = \left[\sum_m \sqrt{\frac{\{I^{(j-1)}(u)\}_M}{I^{(j-1)}(u_m)}} \delta(u-u_m)\right] \times \mathcal{T}^{(j-1)}(u).$$

By using $\Phi^{(j-1)}(x)$ ( $\mathcal{T}^{(j)}(u)$) as the initial phase (the target amplitude), $\Phi^{(j)}(x)$ can be determined by either the conventional WGS algorithm or the phase-fixed method where the u-plane phase $\psi_i(u)$ is fixed to $\psi_N(u)$ during the iteration for all j. During the initial adaptive iteration, $g_i(u)$ can be selected as the last value used during the calculation of the CGH phase $\Phi(x)$ used to generate the recorded pattern. For the phase-locked method, at each subsequent iteration, the algorithm proceeds as discussed with reference to FIG. 1C, but also by replacing $\mathcal{T}(u)$ with $\mathcal{T}^{(j)}(u)$ and with $\psi_N(u)$ locked for all iterations. In other words, the measured image produces feedback about system imperfections by way of updating $\mathcal{T}(u)$ using a CGH 103 generated, for example, using the method discussed with reference to FIG. 1C.

An exemplary embodiment of the disclosed technique is now described. As described below, the example demonstrates that, in some embodiments, the phase-fixed method rapidly and reliably finds the adaptive CGH corrections faster than the traditional WGS algorithm. In the example, a laser beam (wavelength $\lambda$=795 nm) was expanded through a telescope to fill the full area of a phase SLM (X13138-02 LCOS-SLM Optical Phase Modulator, offered by Hamamatsu™). The SLM displayed a CGH computed from IFTAs that produced a LOFA at the focal plane of an achromatic lens (f=250 mm), which was then imaged with a CMOS camera (DCC1645C USB 2.0 CMOS Camera, 1280×1024, Color Sensor, offered by Thorlabs™).

Figure 3A:
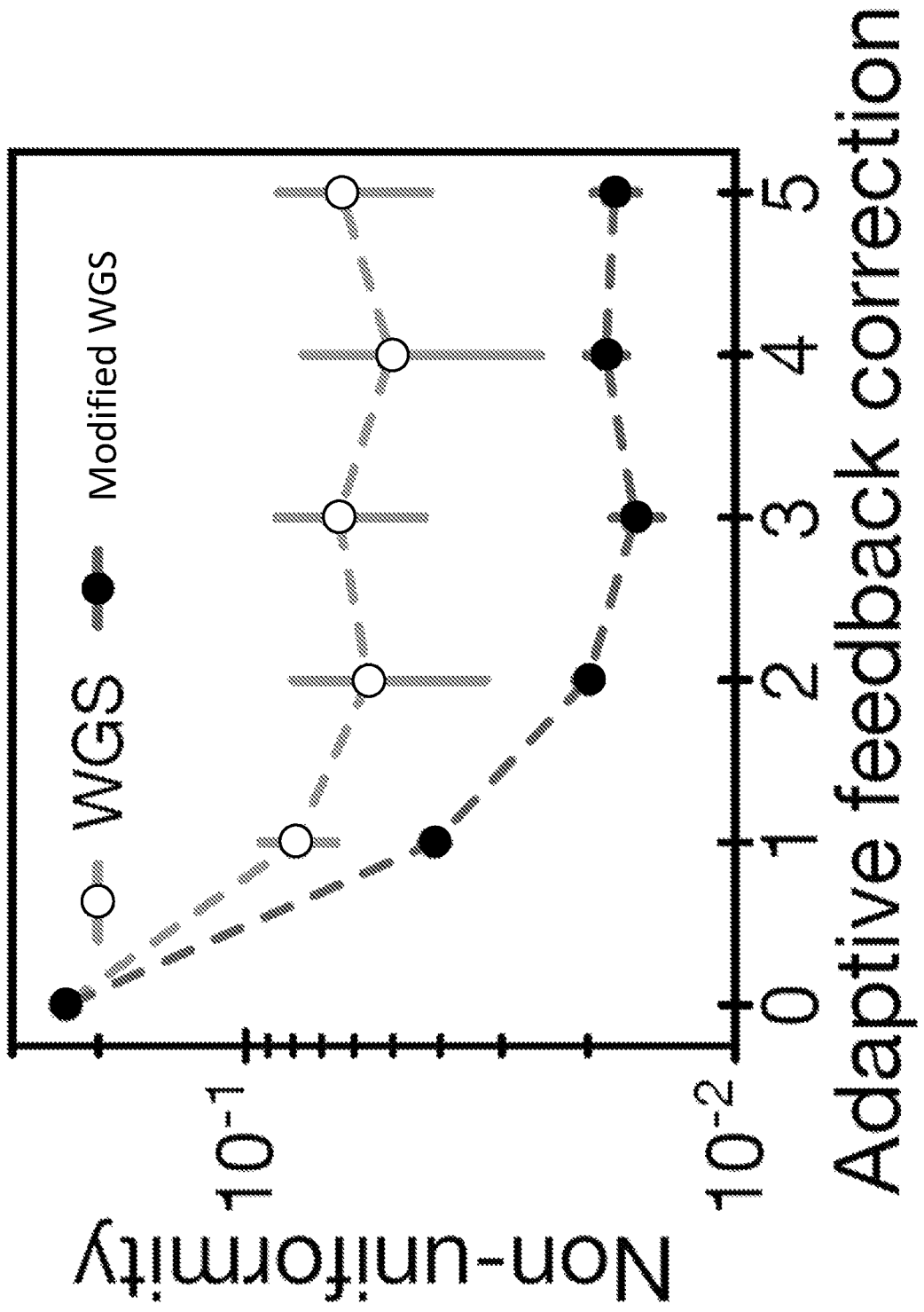
FIGS. 3A-3D show example adaptive CGH corrections and comparisons between modified and traditional weighted Gerchberg-Saxton algorithms, according to some embodiments.

As shown in FIGS. 3A-3D, this configuration was used to test an exemplary application of adaptive CGH corrections to produce a uniform LOFA consisting of 50×30 optical foci. The uncorrected $\Phi^{(0)}(x)$ (e.g., the CGH shown in FIG. 2B) initially resulted in a LOFA with an intensity non-uniformity of 22% as measured by the standard deviation from the target pattern. Applying the repetitive CGH correction with the WGS and modified WGS algorithms discussed above reduced the non-uniformity as plotted in FIG. 3A. Each point in FIG. 3A represents 8 ensembles of the repetitive adaptive correction, and error bars denote non-uniformity uncertainty (standard deviation) in the ensembles. In this example, the series of adaptive CGH corrections (from uncorrected $\Phi^{(0)}(x)$ to fifth-corrected $\Phi^{(5)}(x)$) is repeated 8 times to produce 8 ensembles. Within each exemplary ensemble, noise in CMOS, for example, has a different realization. Averaging the 8 ensembles can reveal how noise can contribute to the uniformity of produced LOFAs and the reliability of the adaptive correction procedures. Compared to the correction using the conventional WGS algorithm (open circles), the phase-fixed modified WGS algorithm (black circles) performed a more rapid and reliable CGH correction, achieving 1.59±0.18% non-uniformity with only three correction steps. The correction with the WGS algorithm, by contrast, achieved only a 6.47±2.14% non-uniformity with the same number of corrections.

Figure 3B:
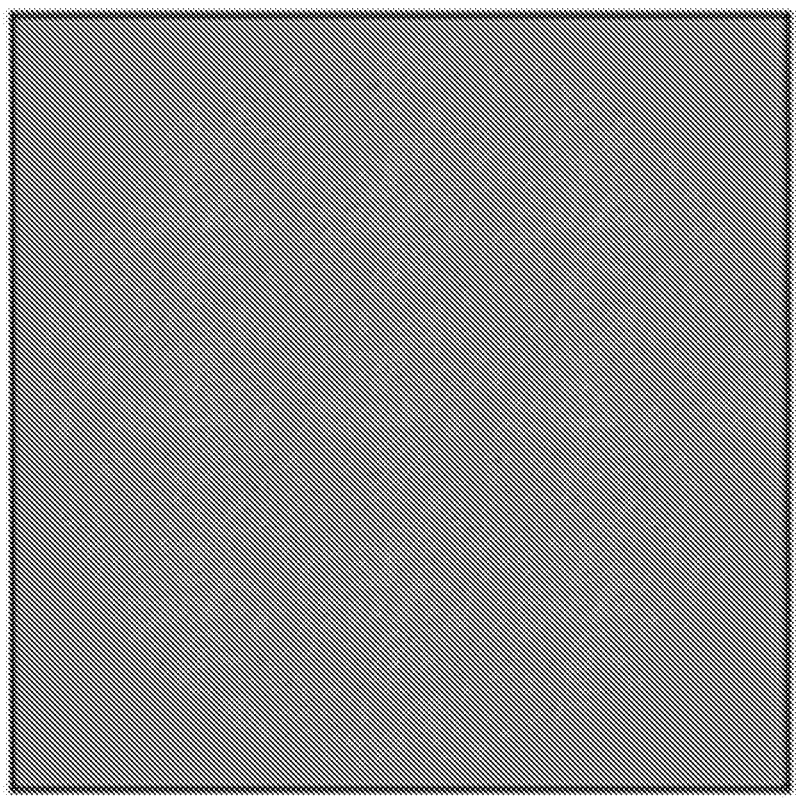
Figure 3B:
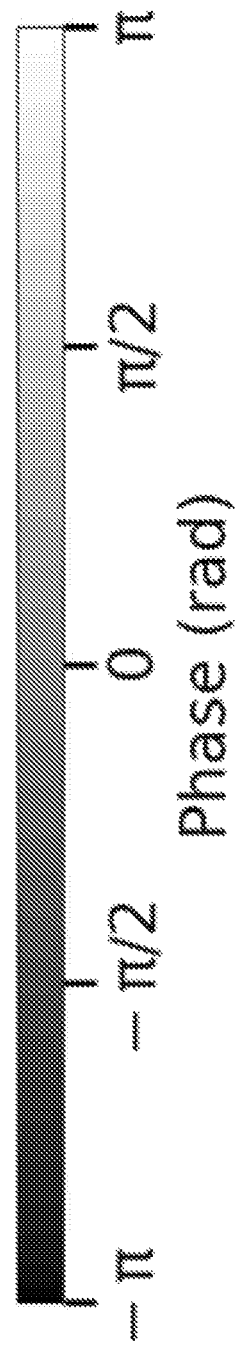
Figure 3C:
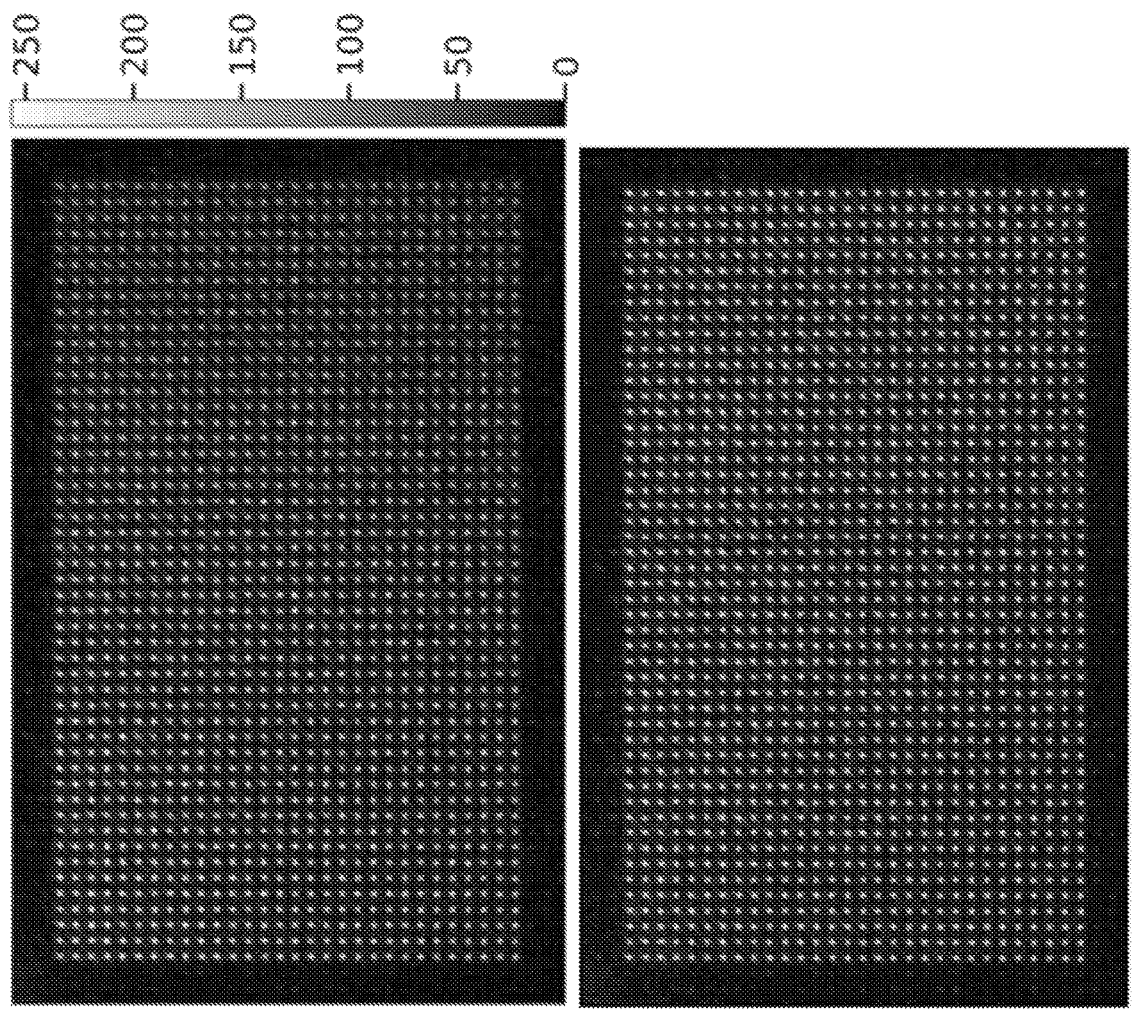
Figure 3D:
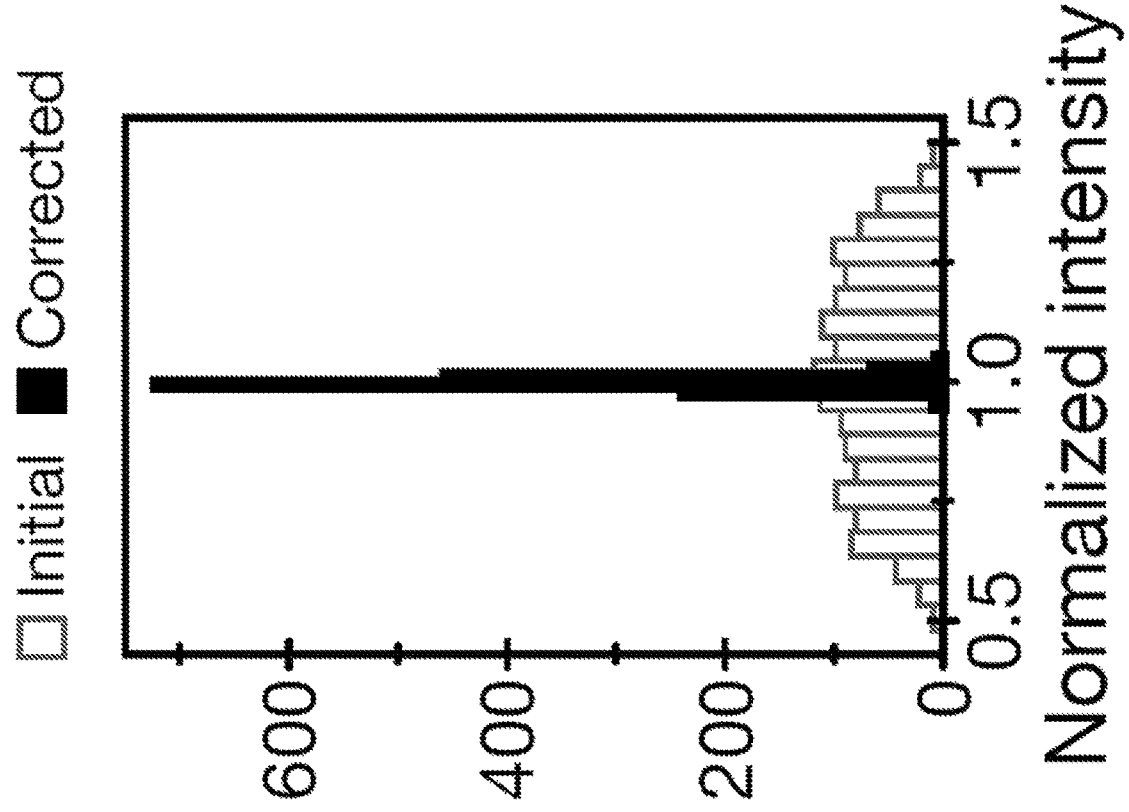

FIG. 3B shows an exemplary CGH correction, which can be calculated by subtracting the original CGH $\Phi^{(0)}(x)$) from the CGH generated from the adaptive CGH correction ($\Phi^{(3)}(x)$). In other words, FIG. 3B shows the phase adjustments made by the adaptive CGH algorithm to the originally computed CGH (using the modified WGS algorithm above, for both CGHs). FIG. 3C shows exemplary CMOS camera raw images of a 50 by 30 LOFA with a three-iteration phase-fixed correction $\Phi^{(3)}(x)$. The top pane shows the image taken with the original CGH $\Phi^{(0)}(x)$, while the bottom pane shows the image taken after the correction $\Phi^{(3)}(x)$. The mean diameter of each focal point ($1/e^2$) is approximately 15 μm. As can be seen in the two panes, the image post correction is brighter and more uniform. FIG. 3D shows a histogram plotting the average intensity of optical foci. As shown with white bars, the initial exemplary intensity non-uniformity was 22% (as measured by the standard deviation), which was reduced down to 1.4% (black bars) after applying the adaptive CGH correction shown in FIG. 3B. Thus, the modified WGS algorithm can also be used to adaptively correct CGHs to significantly reduce non-uniformity in optical foci.

Figure 4:
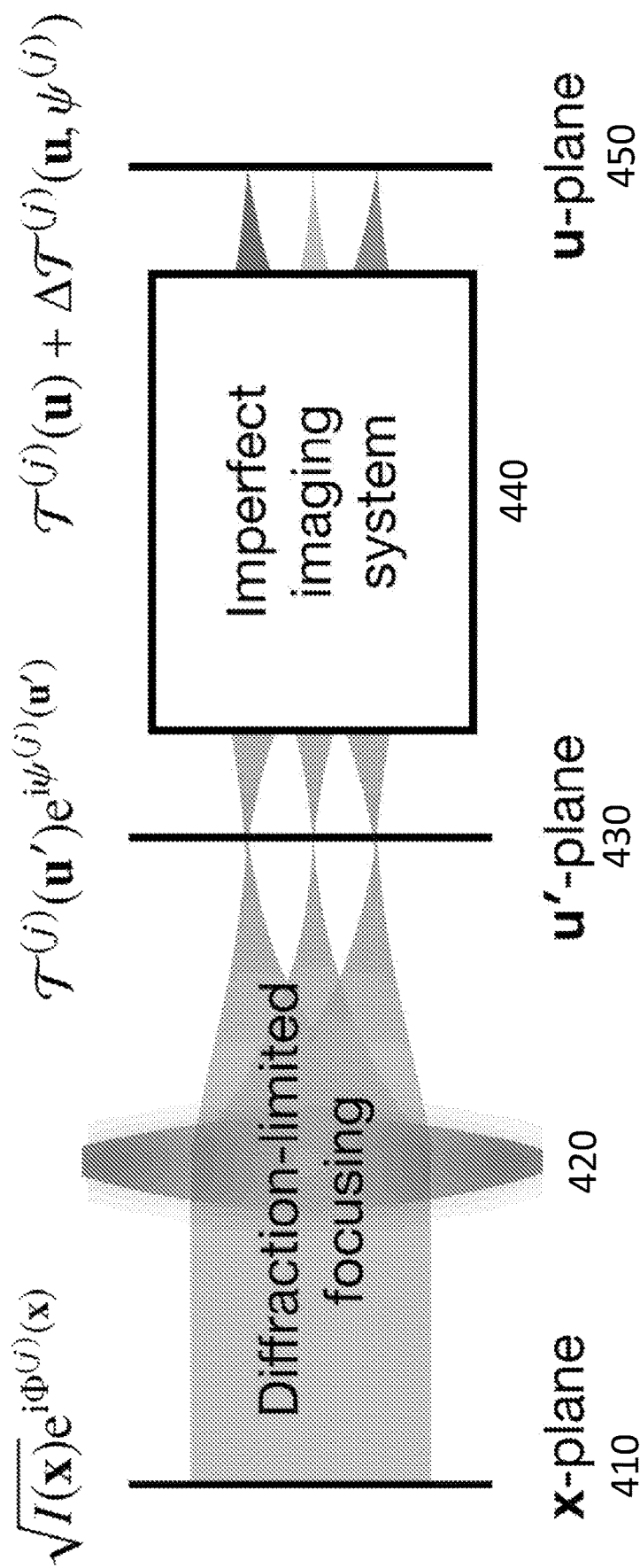
FIG. 4 shows a three-plane model for adaptive CGH corrections, according to some embodiments.

According to some embodiments, and without wishing to be bound by theory, the rapid and reliable correction using the modified WGS algorithm can be understood using an illustrative three-plane model shown in FIG. 4. In this exemplary model, the SLM on the x-plane 410 and the focusing lens 420 are assumed to be ideal, thus $\Phi^{(j)}(x)$ forms the target $\mathcal{T}^{(j)}(u')\exp[i\,\psi^{(j)}(u')]$ on the intermediate u'-plane 430. $\psi^{(j)}(u')$ is specified by running the j-th correction IFTA. All the system-imperfections are lumped into a virtual (imperfect) imaging system 440 that maps u'-plane 430 to u-plane 450 with a measured irregularity $\Delta \mathcal{T}^{(j)}(u)$. According to some embodiments, the model ignores the non-uniformity expected from the IFTA ($\mathcal{O}(10^{-3})$), which can be much smaller than the non-uniformity from the measurement ($\mathcal{O}(10^{-2})$). Note that $\Delta \mathcal{T}^{(j)}(u)$ can depend on $\psi^{(j)}(u')$ in this configuration.

In an example, the adaptive CGH corrections using the conventional WGS algorithm can be considered. When $\Phi^{(j)}(x)$ is computed from $\Phi^{(j-1)}(x)$, $\psi^{(j)}(u')$ can rotate from $\psi^{(j-1)}(u')$. This phase rotation can introduce an additional non-uniformity in $\Delta \mathcal{T}^{(j)}(u)$, which is unaccounted for when $\mathcal{T}^{(j)}(u)$ is adjusted from $\Delta \mathcal{T}^{(j-1)}(u)$. Moreover, CMOS camera noise in $\Delta \mathcal{T}^{(j-1)}(u)$ can also contribute to the phase rotation and add the subsequent non-uniformity noise in $\Delta \mathcal{T}^{(j)}(u)$. By contrast, the phase-fixed modified WGS method for computing $\Phi^{(j)}(x)$ can be free from such phase rotations, enabling rapid and reliable correction of $\Delta \mathcal{T}^{(j-1)}(u)$.

The use of SLMs enables generation of arbitrary LOFA geometries, such as a hexagonal lattice and disordered geometries. These geometries, for example, provide interesting potential applications for quantum many-body physics simulation. Such quantum many-body simulations are described, for example, in PCT Application No. 2018/42080, titled "Neutral Atom Quantum Information Processor," the contents of which are incorporated herein by reference in its entirety.

Figure 5A:
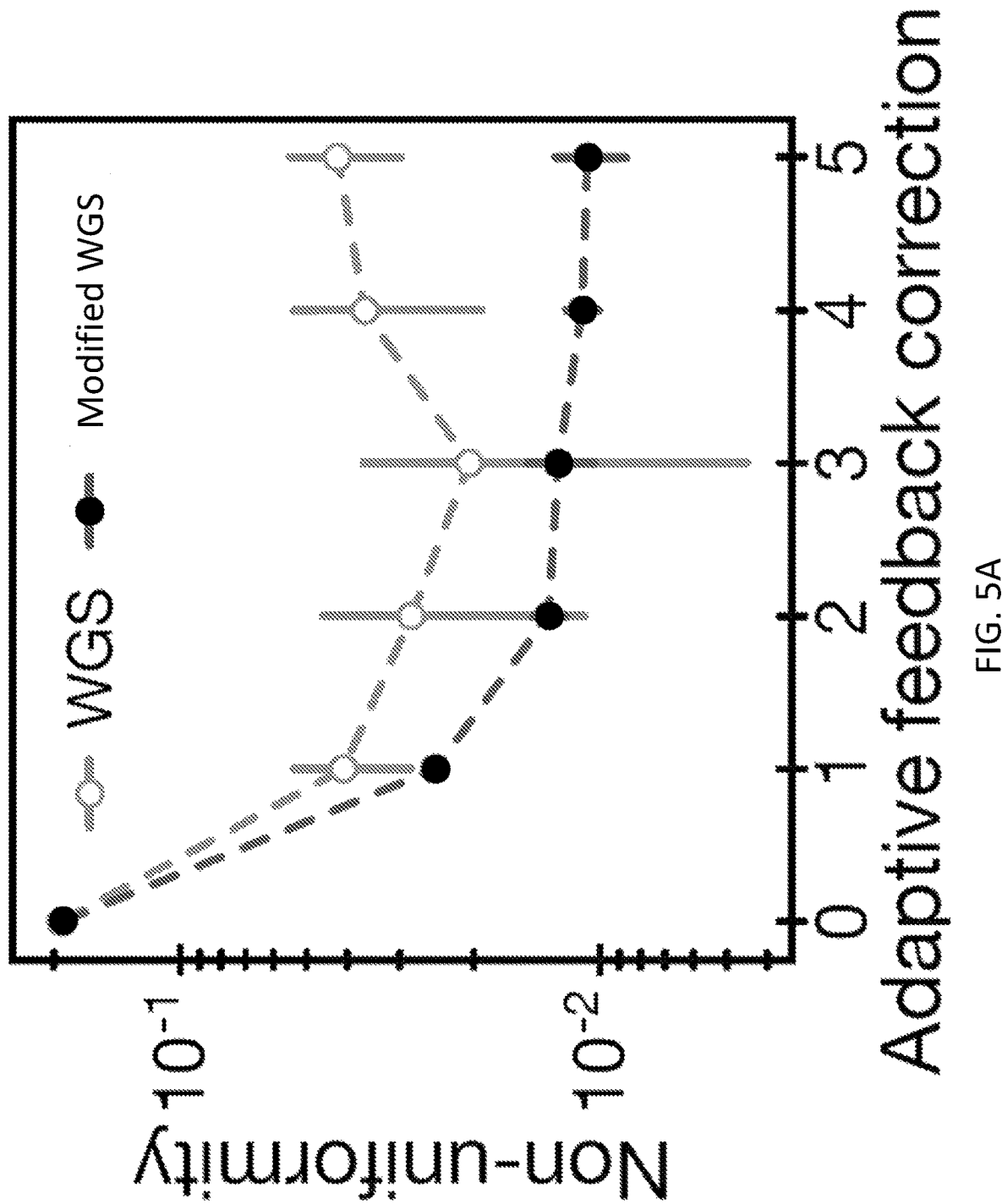
FIGS. 5A-5F show adaptive CGH corrections and comparisons between modified and traditional weighted Gerchberg-Saxton algorithms, according to some embodiments.
Figure 5B:
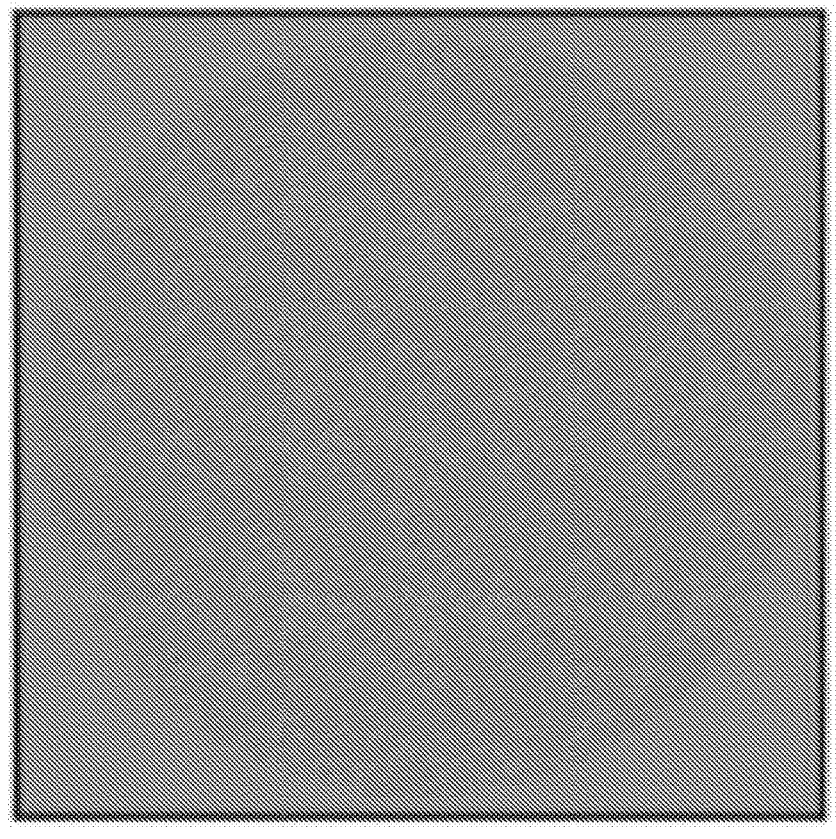
Figure 5B:
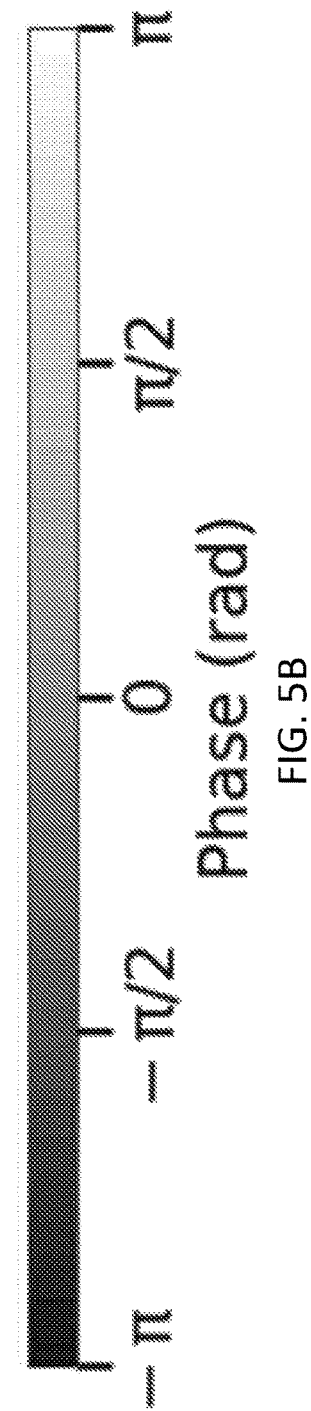
Figure 5C:
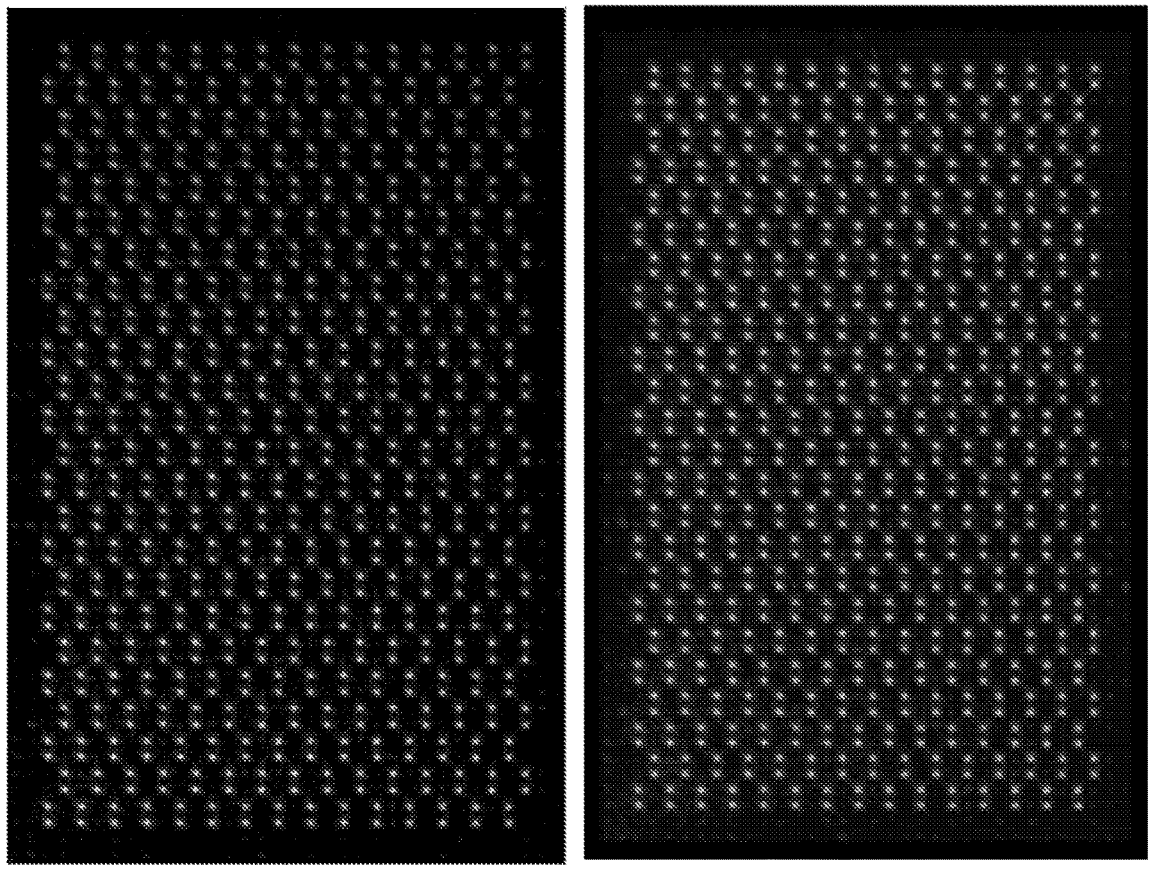
Figure 5D:
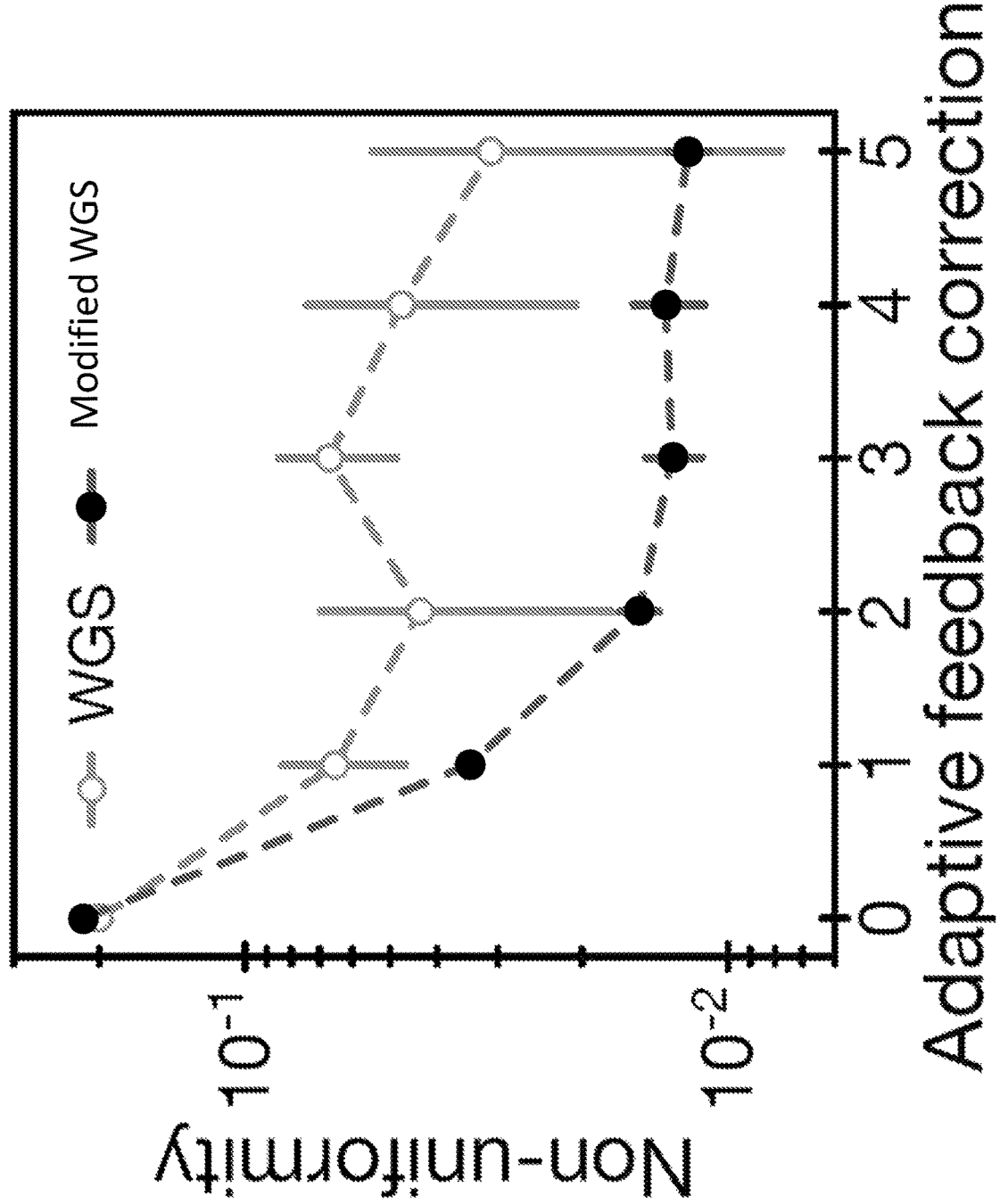
Figure 5E:
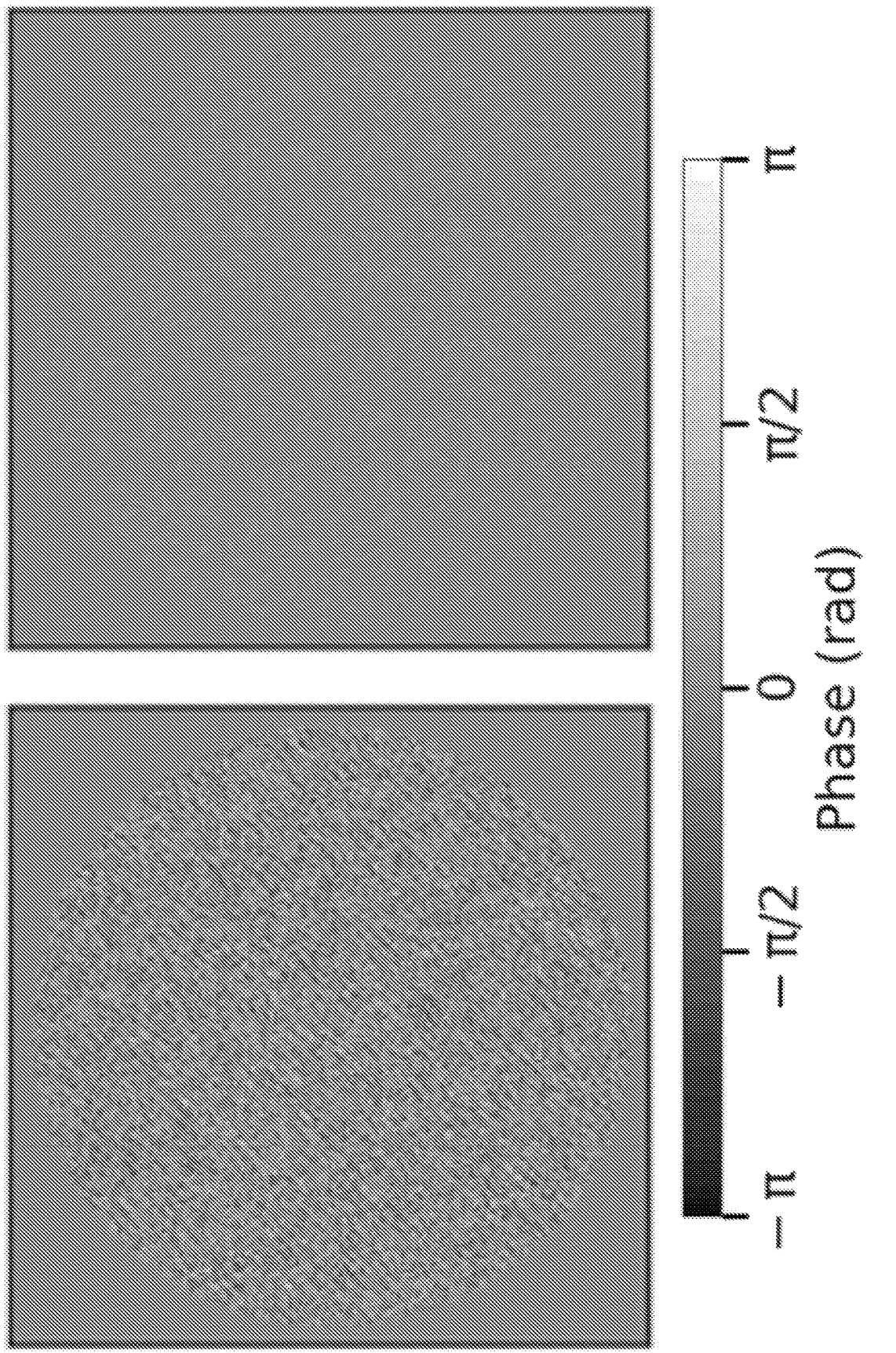
Figure 5F:
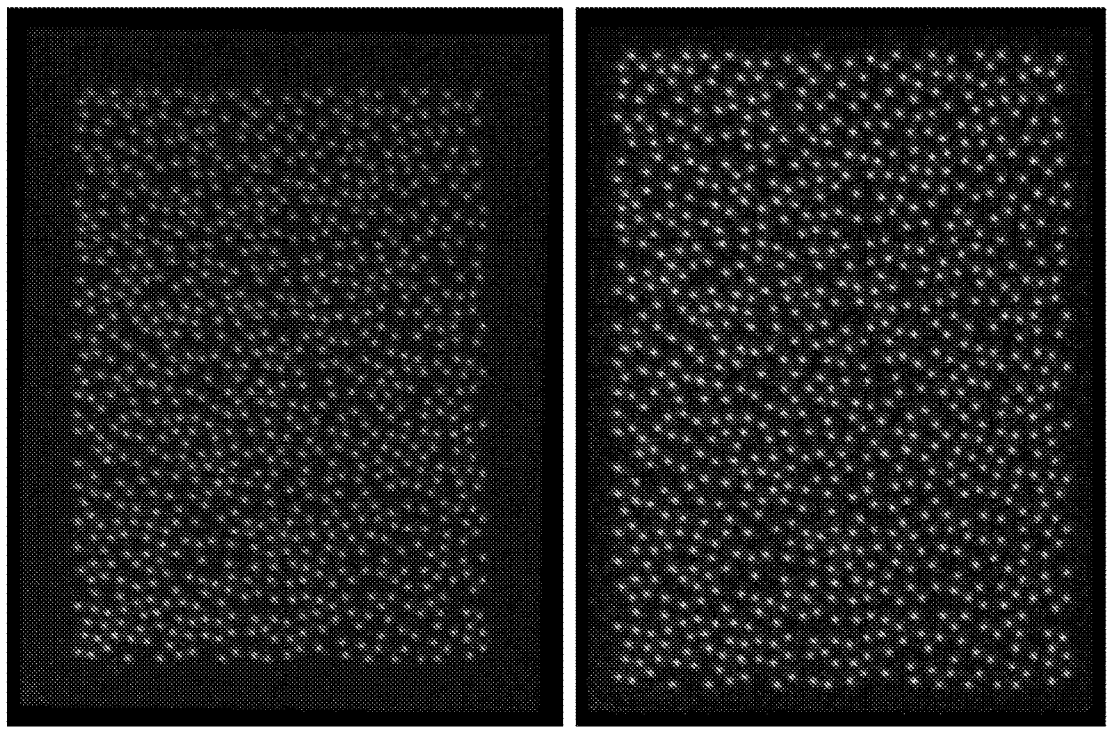

FIGS. 5A and 5D show non-uniformity as a function of feedback correction (feedback iterations) for a hexagonal lattice (720 foci) and disordered geometries (819 foci), respectively. Each of FIGS. 5A and 5D show the traditional WGS algorithm (white dots) compared with the modified WGS algorithm (black dots). Each point represents 8 ensembles of the repetitive adaptive correction, and error bars denote non-uniformity uncertainty (standard deviation) in the ensembles. The left panes of FIGS. 5B and 5D show uncorrected CGH $\Phi^{(0)}(x)$ superimposed with a phase grating to spatially separate the unmodulated zeroth order for exemplary hexagonal and disordered geometries, respectively. The right panes of FIGS. 5B and 5D show the CGH correction $\Phi^{(5)}(x) - \Phi^{(0)}(x)$ determined by a phase-fixed method, similar to the plot in FIG. 2B for hexagonal lattice and disordered geometries, respectively. As can be seen in FIGS. 5A and 5D, uniform LOFAs of the hexagonal lattice and disordered geometries can be produced more quickly and with lower non-uniformity using the modified WGS algorithm compared with the traditional WGS algorithm. For example, by applying the phase-fixed method, LOFA non-uniformities of 1.1±0.20% and 1.2±0.11% can be achieved by the adaptively corrected CGHs $\Phi^{(5)}(x)$ that include the corrections in FIGS. 5B and 5E to the hexagonal lattice and disordered geometries, respectively. Both cases show greater reliability and convergence of the phase-fixed method compared to the conventional WGS algorithm to counteract the system-induced non-uniformity. FIGS. 5C and 5F show exemplary CMOS camera raw images of the LOFAs discussed above both before (top pane) and after (bottom pane) application of five-iteration phase-fixed corrections $\Phi^{(5)}(x)$. The post-correction images appear both brighter and more uniform. Such LOFAs, that were generated using the modified WGS adaptive correction discussed above, not only improve upon the initial generated CGHs, but also improve those CGHs more than with traditional WGS adaptive corrections.

In some embodiments, a method includes: performing a weighted Gerchberg-Saxton algorithm for a first number of iterations until a phase-locking condition is satisfied; performing the weighted Gerchberg-Saxton algorithm with a locked focal plane phase function for a second number of iterations; and controlling, after the second number of iterations, a phase spatial light modulator ("SLM") with a resulting back focal plane phase function from the phase-fixed, weighted Gerchberg-Saxton algorithm.

In some embodiments, the method further includes recording an image of the light produced by the SLM using the resulting back focal plane phase function from the phase-fixed weighted Gerchberg-Saxton algorithm; iteratively performing the phase-fixed weighted Gerchberg-Saxton algorithm for a third number of iterations using the recorded images of the light produced by the SLM using the back focal plane phase function from the phase-fixed weighted Gerchberg-Saxton algorithm in the second number of iterations; iteratively controlling, after the third number of iterations, the phase spatial light modulator ("SLM") with a second resulting back focal plane phase function from the phase-fixed weighted Gerchberg-Saxton algorithm to form an optical focus array; and repeating, at least once, the iteratively performing and controlling steps.

According to some of the embodiments described above, the method to generate uniform large-scale optical focus arrays (LOFAs) using a phase SLM can greatly improve on prior CGH generation algorithms. In some embodiments, the disclosed modified WGS algorithm can avoid the undesired phase rotation in the conventional weighted-Gerchberg Saxton algorithm. This approach can therefore reduce the number of iterations to find computer-generated holograms of highly-uniform LOFAs. Example implementations show that the phase-fixed modified WGS algorithm can also reliably counteract optical system imperfections that can degrade LOFA intensity uniformity. In some exemplary implementations, with three adaptive correction steps, this approach produces arbitrary LOFA geometries consisting of $\mathcal{O}(10^3)$ foci with a uniformity>98%. In some embodiments, modified WGS algorithms can be used in a range of applications including optical microscopy, optical information processing, and quantum control for atoms and solid-state quantum emitters. In some examples, LOFAs produced by the modified WGS algorithm can be used to control arrays of ultra-cold atoms for quantum computing and quantum simulation applications.

Figure 6:
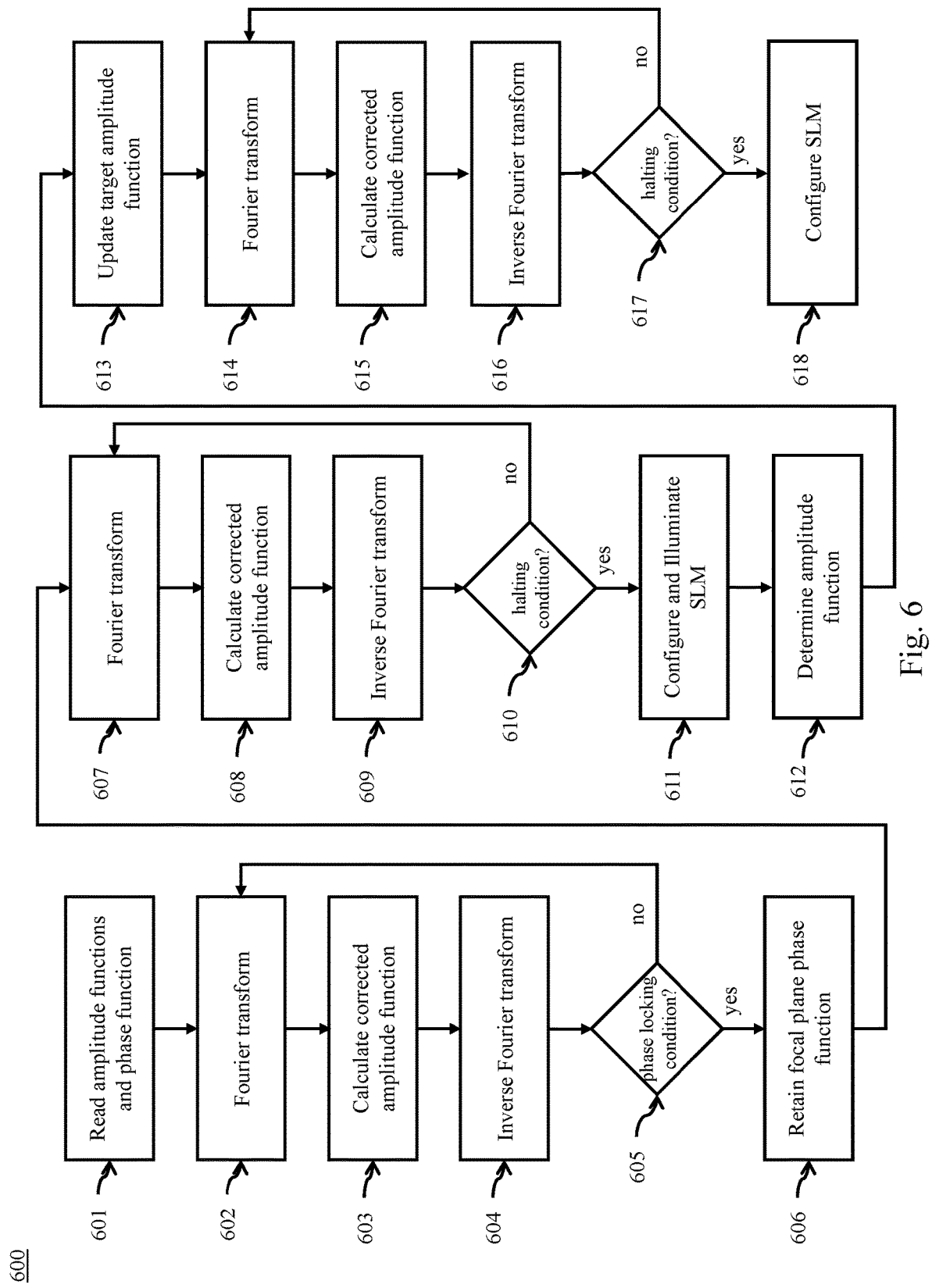
FIG. 6 illustrates a method for optical focus array generation according to embodiments of the present disclosure.

Referring now to FIG. 6, a method for optical focus array generation is illustrated according to embodiments of the present disclosure. At 601, a light source amplitude function, a target amplitude function, and a phase function are read. At 602 . . . 604 a first iterative process is performed until a phase locking condition 605 is satisfied. At 602, a Fourier transform is performed on the light source amplitude function and the phase function to produce a focal plane amplitude function and a focal plane phase function. At 603, a corrected amplitude function is calculated based on the focal plane amplitude function and the target amplitude function. At 604, an inverse Fourier transform is performed on the corrected amplitude function and the focal plane phase function to update the phase function. If condition 605 is not satisfied, process 602 . . . 604 is repeated. If condition 605 is satisfied then the focal plane phase function is retained as a locked phase function at 606.

At 607 . . . 609, a second iterative process is performed until a first halting condition is satisfied. At 607, a Fourier transform is performed on the light source amplitude function and the phase function to produce a focal plane amplitude function and a focal plane phase function. At 608, a corrected amplitude function is calculated based on the focal plane amplitude function and the target amplitude function. At 609, an inverse Fourier transform is performed on the corrected amplitude function and the locked phase function to update the phase function.

If condition 610 is satisfied, a phase spatial light modulator ("SLM") is configured and illuminated with a light source, thereby generating a phase-modulated beam at 611. The light source conforms to the light source amplitude function. The beam has an amplitude function and a phase function. The beam is directed to a focal plane. A photodetector is configured to detect an interference pattern generated by the beam at the focal plane. In some cases, further optimization may be unnecessary, such as when the interference pattern reaches a predetermined uniformity condition. In such cases, the process may halt after configuration and illumination of the SLM. At 612, an amplitude function of the interference pattern is determined from the photodetector. At 613, the target amplitude function is updated based on the amplitude function of the interference pattern.

At 614 . . . 616, a third iterative process is performed until a halting condition 617 is satisfied. At 614, a Fourier transform is performed on the amplitude function of the beam and the phase function of the beam to produce a focal plane amplitude function and a focal plane phase function. At 615, a corrected amplitude function is calculated based on the focal plane amplitude function and the target amplitude function. At 616, an inverse Fourier transform is performed on the corrected amplitude function and the locked phase function to update the phase function. If condition 617 is not satisfied, process 614 . . . 616 is repeated. If condition 617 is satisfied, the SLM is configured according to the phase function, thereby controlling the phase function of the beam at 618. It will be appreciated that illumination of the SLM may be maintained during some or all of the preceding process. If illumination is not maintained, then the SLM may be illuminated again after reconfiguration in order to generate a bean conforming to the phase function.

Figure 7:
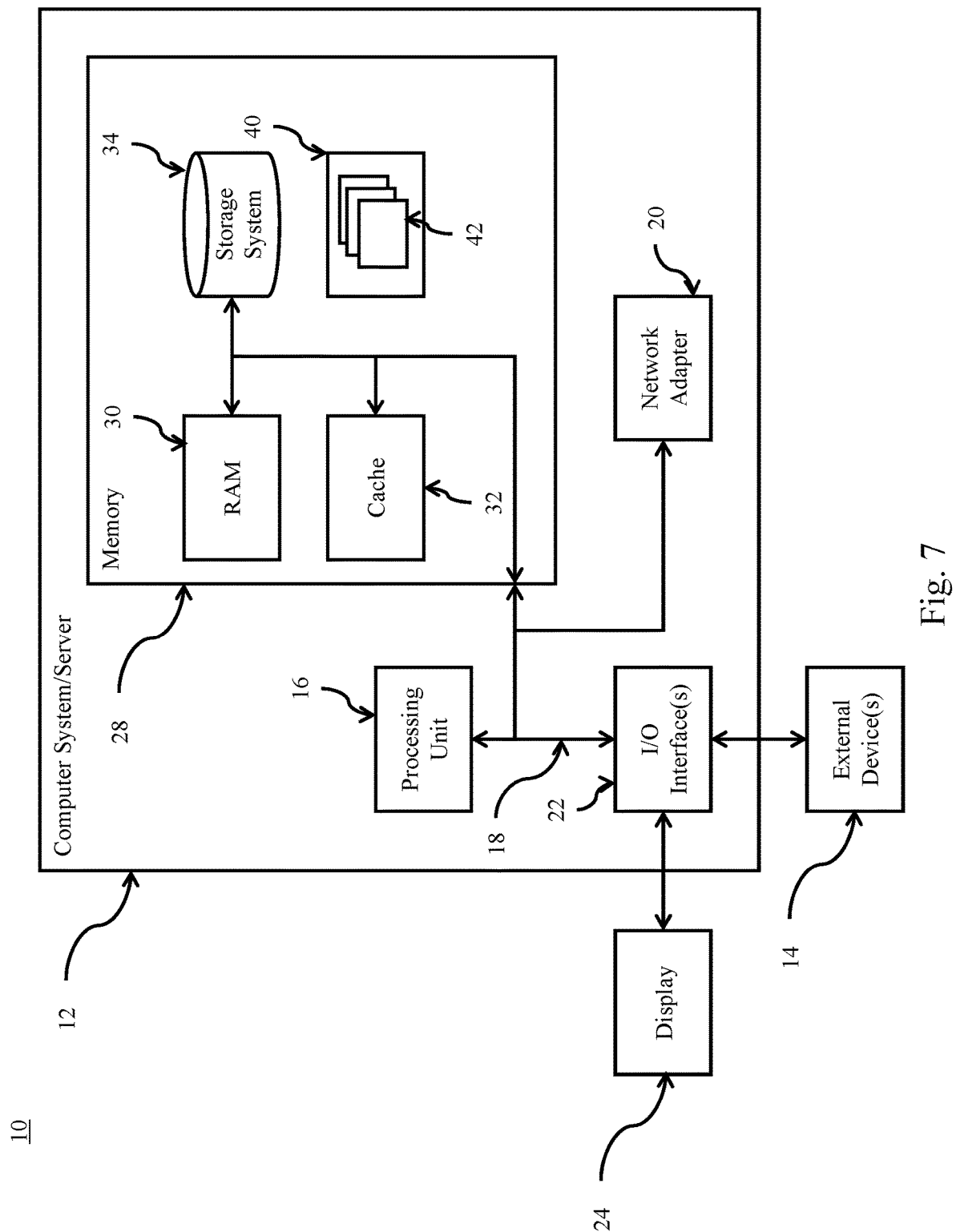
FIG. 7 depicts a computing node according to an embodiment of the present disclosure.

Referring now to FIG. 7, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Accordingly, in a first example embodiment, the present disclosure provides a system comprising a computing node configured to: read a light source amplitude function, a target amplitude function, and a phase function; iteratively: perform a Fourier transform on the light source amplitude function and the phase function to produce a focal plane amplitude function and a focal plane phase function, calculate a corrected amplitude function based on the focal plane amplitude function and the target amplitude function, and perform an inverse Fourier transform on the corrected amplitude function and the focal plane phase function to update the phase function until a phase-locking condition is satisfied in a first iterative process; retain the focal plane phase function as a locked phase function; and iteratively: perform a Fourier transform on the light source amplitude function and the phase function to produce a focal plane amplitude function and a focal plane phase function, calculate a corrected amplitude function based on the focal plane amplitude function and the target amplitude function, and perform an inverse Fourier transform on the corrected amplitude function and the locked phase function to update the phase function until a first halting condition is satisfied in a second iterative process.

In a first aspect of the first example embodiment, the system further comprises a phase spatial light modulator ("SLM"); a light source configured to illuminate the SLM, the light source conforming to the light source amplitude function, thereby generating a phase-modulated beam, the beam having an amplitude function and a phase function; and at least one photodetector configured to detect an interference pattern generated by the beam at a focal plane, wherein the computing node is operatively coupled to the SLM and the photodetector, and is further configured to configure the SLM according to the phase function, thereby controlling the phase function of the beam; determine from the photodetector an amplitude function of the interference pattern; update the target amplitude function based on the amplitude function of the interference pattern; iteratively: perform a Fourier transform on the amplitude function of the beam and the phase function of the beam to produce a focal plane amplitude function and a focal plane phase function, calculate a corrected amplitude function based on the focal plane amplitude function and the target amplitude function, perform an inverse Fourier transform on the corrected amplitude function and the locked phase function to update the phase function until a second halting condition is satisfied in a third iterative process; and configure the SLM according to the phase function, thereby controlling the phase function of the beam.

In a second aspect of the first example embodiment, the computing node is further configured to: update the target amplitude function and repeat said third iterative process.

In a third aspect of the first example embodiment, the phase-locking condition comprises a number of iterations, which, for example, can be selected by a user. For example, the number of iterations can be from 3 to 15. The remainder of the features of the present system are as described with respect to any of the aspects of the first example embodiment.

In a fourth aspect of the first example embodiment, the phase-locking condition comprises one or more of an efficiency threshold of the focal plane amplitude function or a uniformity threshold of the focal plane amplitude function. The remainder of the features of the present system are as described with respect to any of the aspects of the first example embodiment.

In a fifth aspect of the first example embodiment, the first halting condition comprises a number of iterations, which, for example, can be selected by a user. For example, the number of iterations can be from 3 to 15. The remainder of the features of the present system are as described with respect to any of the aspects of the first example embodiment.

In a sixth aspect of the first example embodiment, the first halting condition comprises one or more of an efficiency threshold of the focal plane amplitude function or a uniformity threshold of the focal plane amplitude function. The remainder of the features of the present system are as described with respect to any of the aspects of the first example embodiment.

In a seventh aspect of the first example embodiment, the second halting condition comprises a number of iterations, which, for example, can be selected by a user. For example, the number of iterations can be from 3 to 15. The remainder of the features of the present system are as described with respect to any of the aspects of the first example embodiment.

In an eighth aspect of the first example embodiment, the second halting condition comprises one or more of an efficiency threshold of the focal plane amplitude function or a uniformity threshold of the focal plane amplitude function. The remainder of the features of the present system are as described with respect to any of the aspects of the first example embodiment.

In a ninth aspect of the first example embodiment, the computing node is further configured to calculate one or more of the efficiency of the focal plane amplitude function or the uniformity of the focal plane amplitude function; and compare the efficiency of the focal plane amplitude function to the efficiency threshold and/or the uniformity of the focal plane amplitude to the uniformity threshold. The remainder of the features of the present system are as described with respect to any of the aspects of the first example embodiment.

In a tenth aspect of the first example embodiment, the computing node is further configured to receive the efficiency threshold or the uniformity threshold from a user. The remainder of the features of the present system are as described with respect to any of the aspects of the first example embodiment.

In an eleventh aspect of the first example embodiment, the interference pattern generated by the beam at the focal plane forms a regular lattice of maxima. The remainder of the features of the present system are as described with respect to any of the aspects of the first example embodiment.

In a twelfth aspect of the first example embodiment, the interference pattern generated by the beam at the focal plane forms a disordered lattice of maxima. The remainder of the features of the present system are as described with respect to any of the aspects of the first example embodiment.

In a thirteenth aspect of the first example embodiment, the light source amplitude function is a two-dimensional Gaussian amplitude function. The remainder of the features of the present system are as described with respect to any of the aspects of the first example embodiment.

In a fourteenth aspect of the first example embodiment, the system further comprises at least one lens, the at least one lens configured to focus the beam onto the focal plane. The remainder of the features of the present system are as described with respect to any of the aspects of the first example embodiment.

In a fifteenth aspect the of first example embodiment, the light source amplitude function is detected by a photodetector. The remainder of the features of the present system are as described with respect to any of the aspects of the first example embodiment.

In a sixteenth aspect the of first example embodiment, the interference pattern generated by the beam at the focal plane comprises a plurality of foci, each having an amplitude, wherein updating the target amplitude function comprises computing a mean amplitude of the plurality of foci and comparing the amplitude of each of the plurality of foci to the mean amplitude. The remainder of the features of the present system are as described with respect to any of the aspects of the first example embodiment.

In a second example embodiment, the present disclosure provides a method comprising: reading a light source amplitude function, a target amplitude function, and a phase function; iteratively: performing a Fourier transform on the light source amplitude function and the phase function to produce a focal plane amplitude function and a focal plane phase function, calculating a corrected amplitude function based on the focal plane amplitude function and the target amplitude function, and performing an inverse Fourier transform on the corrected amplitude function and the focal plane phase function to update the phase function, until a phase-locking condition is satisfied in a first iterative process; retaining the focal plane phase function as a locked phase function; and iteratively performing a Fourier transform on the light source amplitude function and the phase function to produce a focal plane amplitude function and a focal plane phase function, calculating a corrected amplitude function based on the focal plane amplitude function and the target amplitude function, and performing an inverse Fourier transform on the corrected amplitude function and the locked phase function to update the phase function until a first halting condition is satisfied in a second iterative process.

In a first aspect of the second example embodiment, the method further comprises illuminating a phase spatial light modulator ("SLM") with a light source, thereby generating a phase-modulated beam, the light source conforming to the light source amplitude function, the beam having an amplitude function and a phase function, the beam being directed to a focal plane, a photodetector being configured to detect an interference pattern generated by the beam at the focal plane; configuring the SLM according to the phase function, thereby controlling the phase function of the beam; determining from the photodetector an amplitude function of the interference pattern; updating the target amplitude function based on the amplitude function of the interference pattern; iteratively: performing a Fourier transform on the amplitude function of the beam and the phase function of the beam to produce a focal plane amplitude function and a focal plane phase function, calculating a corrected amplitude function based on the focal plane amplitude function and the target amplitude function, performing an inverse Fourier transform on the corrected amplitude function and the locked phase function to update the phase function until a second halting condition is satisfied in a third iterative process; and configuring the SLM according to the phase function, thereby controlling the phase function of the beam.

In a second aspect of the second example embodiment, the method further comprises updating the target amplitude function and repeating the third iterative process.

In a third aspect of the second example embodiment, the phase-locking condition comprises a number of iterations, which, for example, can be selected by a user. For example, the number of iterations is from 3 to 15. The remainder of the features of the present method are as described with respect to any of the aspects of the second example embodiment.

In a fourth aspect of the second example embodiment, the phase-locking condition comprises one or more of an efficiency threshold of the focal plane amplitude function or a uniformity threshold of the focal plane amplitude function. The remainder of the features of the present method are as described with respect to any of the aspects of the second example embodiment.

In a fifth aspect of the second example embodiment, the first halting condition comprises a number of iterations, which, for example, can be selected by a user. For example, the number of iterations can be from 3 to 15. The remainder of the features of the present method are as described with respect to any of the aspects of the second example embodiment.

In a sixth aspect of the second example embodiment, the first halting condition comprises one or more of an efficiency threshold of the focal plane amplitude function or a uniformity threshold of the focal plane amplitude function. The remainder of the features of the present method are as described with respect to any of the aspects of the second example embodiment.

In a seventh aspect of the second example embodiment, the second halting condition comprises a number of iterations, which, for example can be selected by a user. For example, the number of iterations can be from 3 to 15. The remainder of the features of the present method are as described with respect to any of the aspects of the second example embodiment.

In an eighth aspect of the second example embodiment, the second halting condition comprises one or more of an efficiency threshold of the focal plane amplitude function or a uniformity threshold of the focal plane amplitude function. The remainder of the features of the present method are as described with respect to any of the aspects of the second example embodiment.

In a ninth aspect of the second example embodiment, the method further comprises calculating one or more of the efficiency of the focal plane amplitude function or the uniformity of the focal plane amplitude function; and comparing the efficiency of the focal plane amplitude function to the efficiency threshold and/or the uniformity of the focal plane amplitude to the uniformity threshold. The remainder of the features of the present method are as described with respect to any of the aspects of the second example embodiment.

In a tenth aspect of the second example embodiment, the method further comprises receiving the efficiency threshold or the uniformity threshold from a user. The remainder of the features of the present method are as described with respect to any of the aspects of the second example embodiment.

In an eleventh aspect of the second example embodiment, the interference pattern generated by the beam at the focal plane forms a regular lattice of maxima. The remainder of the features of the present method are as described with respect to any of the aspects of the second example embodiment.

In a twelfth aspect of the second example embodiment, the interference pattern generated by the beam at the focal plane forms a disordered lattice of maxima. The remainder of the features of the present method are as described with respect to any of the aspects of the second example embodiment.

In a thirteenth aspect of the second example embodiment, the light source amplitude function is a two-dimensional Gaussian amplitude function. The remainder of the features of the present method are as described with respect to any of the aspects of the second example embodiment.

In a fourteenth aspect of the second example embodiment, the method further comprises focusing the beam onto the focal plane with at least one lens. The remainder of the features of the present method are as described with respect to any of the aspects of the second example embodiment.

In a fifteenth aspect the of second example embodiment, the light source amplitude function is detected by a photodetector. The remainder of the features of the present system are as described with respect to any of the aspects of the first example embodiment.

In a sixteenth aspect the of second example embodiment, the interference pattern generated by the beam at the focal plane comprises a plurality of foci, each having an amplitude, wherein updating the target amplitude function comprises computing a mean amplitude of the plurality of foci and comparing the amplitude of each of the plurality of foci to the mean amplitude. The remainder of the features of the present system are as described with respect to any of the aspects of the first example embodiment.

In a third example embodiment, the present disclosure provides a computer program product for optical focus array generation, the computer program product comprising a computer readable storage medium having program instructions embodied therewith, the program instructions executable by a processor to cause the processor to perform a method comprising: reading a light source amplitude function, a target amplitude function, and a phase function; iteratively: performing a Fourier transform on the light source amplitude function and the phase function to produce a focal plane amplitude function and a focal plane phase function, calculating a corrected amplitude function based on the focal plane amplitude function and the target amplitude function, performing an inverse Fourier transform on the corrected amplitude function and the focal plane phase function to update the phase function, until a phase-locking condition is satisfied in a first iterative process; retaining the focal plane phase function as a locked phase function; and iteratively: performing a Fourier transform on the light source amplitude function and the phase function to produce a focal plane amplitude function and a focal plane phase function, calculating a corrected amplitude function based on the focal plane amplitude function and the target amplitude function, performing an inverse Fourier transform on the corrected amplitude function and the locked phase function to update the phase function until a first halting condition is satisfied in a second iterative process.

In a first aspect of the third example embodiment, the method further comprises illuminating a phase spatial light modulator ("SLM") with a light source, thereby generating a phase-modulated beam, the light source conforming to the light source amplitude function, the beam having an amplitude function and a phase function, the beam being directed to a focal plane, a photodetector being configured to detect an interference pattern generated by the beam at the focal plane; configuring the SLM according to the phase function, thereby controlling the phase function of the beam; determining from the photodetector an amplitude function of the interference pattern; updating the target amplitude function based on the amplitude function of the interference pattern; iteratively: performing a Fourier transform on the amplitude function of the beam and the phase function of the beam to produce a focal plane amplitude function and a focal plane phase function, calculating a corrected amplitude function based on the focal plane amplitude function and the target amplitude function, performing an inverse Fourier transform on the corrected amplitude function and the locked phase function to update the phase function until a second halting condition is satisfied in a third iterative process; and configuring the SLM according to the phase function, thereby controlling the phase function of the beam.

In a second aspect of the third example embodiment, the method further comprises updating the target amplitude function and repeating the third iterative process.

In a third aspect of the third example embodiment, the phase-locking condition comprises a number of iterations, which, for example, can be selected by a user. For example, the number of iterations is from 3 to 15. The remainder of the features of the present method are as described with respect to any of the aspects of the second example embodiment.

In a fourth aspect of the third example embodiment, the phase-locking condition comprises one or more of an efficiency threshold of the focal plane amplitude function or a uniformity threshold of the focal plane amplitude function. The remainder of the features of the present method are as described with respect to any of the aspects of the second example embodiment.

In a fifth aspect of the third example embodiment, the first halting condition comprises a number of iterations, which, for example can be selected by a user. For example, the number of iterations can be from 3 to 15. The remainder of the features of the present method are as described with respect to any of the aspects of the second example embodiment.

In a sixth aspect of the third example embodiment, the first halting condition comprises one or more of an efficiency threshold of the focal plane amplitude function or a uniformity threshold of the focal plane amplitude function. The remainder of the features of the present method are as described with respect to any of the aspects of the second example embodiment.

In a seventh aspect of the third example embodiment, the second halting condition comprises a number of iterations, which, for example can be selected by a user. For example, the number of iterations can be from 3 to 15. The remainder of the features of the present method are as described with respect to any of the aspects of the second example embodiment.

In an eighth aspect of the third example embodiment, the second halting condition comprises one or more of an efficiency threshold of the focal plane amplitude function or a uniformity threshold of the focal plane amplitude function. The remainder of the features of the present method are as described with respect to any of the aspects of the second example embodiment.

In a ninth aspect of the third example embodiment, the method further comprises calculating one or more of the efficiency of the focal plane amplitude function or the uniformity of the focal plane amplitude function; and comparing the efficiency of the focal plane amplitude function to the efficiency threshold and/or the uniformity of the focal plane amplitude to the uniformity threshold. The remainder of the features of the present method are as described with respect to any of the aspects of the second example embodiment.

In a tenth aspect of the third example embodiment, the method further comprises receiving the efficiency threshold or the uniformity threshold from a user. The remainder of the features of the present method are as described with respect to any of the aspects of the second example embodiment.

In an eleventh aspect of the third example embodiment, the interference pattern generated by the beam at the focal plane forms a regular lattice of maxima. The remainder of the features of the present method are as described with respect to any of the aspects of the second example embodiment.

In a twelfth aspect of the third example embodiment, the interference pattern generated by the beam at the focal plane forms a disordered lattice of maxima. The remainder of the features of the present method are as described with respect to any of the aspects of the second example embodiment.

In a thirteenth aspect of the third example embodiment, the light source amplitude function is a two-dimensional Gaussian amplitude function. The remainder of the features of the present method are as described with respect to any of the aspects of the second example embodiment.

In a fourteenth aspect of the third example embodiment, the method further comprises focusing the beam onto the focal plane with at least one lens. The remainder of the features of the present method are as described with respect to any of the aspects of the second example embodiment.

In a fifteenth aspect the of third example embodiment, the light source amplitude function is detected by a photodetector. The remainder of the features of the present system are as described with respect to any of the aspects of the first example embodiment.

In a sixteenth aspect the of third example embodiment, the interference pattern generated by the beam at the focal plane comprises a plurality of foci, each having an amplitude, wherein updating the target amplitude function comprises computing a mean amplitude of the plurality of foci and comparing the amplitude of each of the plurality of foci to the mean amplitude. The remainder of the features of the present system are as described with respect to any of the aspects of the first example embodiment.

In certain embodiments, embodiments of the present disclosure are exemplified by the following numbered embodiments:

1. A method comprising:
   (1) performing a Fourier transform on a back focal plane input amplitude function and back focal plane input phase function to produce a focal plane amplitude function and a focal plane phase function;
   (2) calculating a correction factor based on the focal plane amplitude function;
   (3) calculating a corrected focal plane amplitude function based on the correction factor and a target focal plane amplitude function;
   (4) performing an inverse Fourier transform on the corrected focal plane amplitude function and the focal plane phase function to produce an updated back focal plane amplitude function and an updated back focal plane phase function;
   (5) repeating, at least once, the steps (1)-(4) by replacing the back focal plane input phase function with the updated back focal plane phase function until a phase-locking condition is satisfied;
   (6) repeating, at least once, the steps (1)-(4) while locking the focal plane phase function in step (4) to a locked focal plane phase function that is equal to the focal plane phase function at the time that the phase-locking condition is satisfied; and
   (7) after the step (6), modulating the phase of light from a light source with a phase spatial light modulator ("SLM"), wherein the modulating the phase of the light comprises locally shifting the phase of the light by the SLM by an amount that is approximately equal to the updated back focal plane phase function.

2. The method of claim 1, wherein the phase-locking condition comprises one or more of an efficiency of the focal plane amplitude function or a uniformity of the focal plane amplitude function.

3. The method of claim 2, further comprising: calculating one or more of the efficiency of the focal plane amplitude function or the uniformity of the focal plane amplitude function; and comparing the calculated one or more of the efficiency of the focal plane amplitude function or the uniformity of the focal plane amplitude function to one or more of an efficiency threshold or a uniformity threshold to determine that the phase-locking condition is satisfied.

4. The method of claim 3, further comprising receiving information indicative of the one or more of the efficiency threshold or the uniformity threshold from a user.

5. The method of claim 1, wherein the phase-locking condition comprises a preset number of iterations of the steps (1)-(5).

6. The method of claim 5, wherein the preset number of iterations of the steps (1)-(5) is selected by a user.

7. The method of claim 5, wherein the preset number of iterations of the steps (1)-(5) comprises between 3-15 iterations.

8. The method of claim 1, wherein the target focal plane amplitude function comprises at least one or more of a uniform large optical focus array ("LOFA"), a hexagonal lattice LOFA, or a disordered LOFA.

9. The method of claim 1, wherein the back focal plane input amplitude function in the first step (1) is a Gaussian amplitude function.

10. The method of claim 1, further comprising (8) focusing the phase-modulated light onto an image plane with at least one focusing lens.

11. The method of claim 10, further comprising (9) capturing a spatially resolved image of the amplitude of the focused phase-modulated light.

12. The method of claim 11, further comprising:
(10) calculating the corrected focal plane amplitude function based on the spatially resolved image of the amplitude of the focused phase-modulated light and the target focal plane amplitude function;
(11) performing an inverse Fourier transform on the corrected focal plane amplitude function and the fixed focal plane phase function determined from the previous step (6) to produce the updated back focal plane phase function;
(12) performing a Fourier transform on the CGH back focal plane input amplitude function and the back focal plane updated phase function to produce the focal plane amplitude function and the focal plane phase function;
(13) repeating, at least once, the steps (7)-(12);
(14) after the step (13), modulating the phase of light from the light source with the phase SLM, wherein the modulating the phase of the light comprises locally shifting the phase of the light by the SLM by the amount that is approximately equal to the updated back focal plane phase function after the step (14).

13. A system comprising:
a light source;
a phase spatial light modulator ("SLM");
at least one focusing lens;
a computer readable storage medium containing instructions thereon configured to cause a computer to perform the following steps:
(1) perform a Fourier transform on a computer-generated holograph ("CGH") back focal plane input amplitude function and back focal plane input phase function to produce a focal plane amplitude function and a focal plane phase function;
(2) calculate a correction factor based on the focal plane amplitude function;
(3) calculate a corrected focal plane amplitude function based on the correction factor and a target focal plane amplitude function;
(4) perform an inverse Fourier transform on the corrected focal plane amplitude function and the focal plane phase function to produce an updated back focal plane phase function;
(5) repeat, at least once, the steps (1)-(4) by replacing the back focal plane input phase function with the updated back focal plane phase function until a phase-locking condition is satisfied;
(6) repeat, at least once, the steps (1)-(4) while locking the focal plane phase function in step (4) to a locked focal plane phase function that is equal to the focal plane phase function at the time that the phase-locking condition is satisfied; and
(7) after the step (6), modulate the phase of light from the light source with the phase SLM, wherein the modulating the phase of the light comprises locally shifting the phase of the light by the SLM by an amount that is approximately equal to the updated back focal plane phase function.

14. The system of claim 13, wherein the phase-locking condition comprises one or more of an efficiency of the focal plane amplitude function or a uniformity of the focal plane amplitude function.

15. The system of claim 14, wherein the instructions are further configured to cause the computer to: calculate one or more of the efficiency of the focal plane amplitude function or the uniformity of the focal plane amplitude function; and compare the calculated one or more of the efficiency of the focal plane amplitude function or the uniformity of the focal plane amplitude function to one or more of an efficiency threshold or a uniformity threshold to determine that the phase-locking condition is satisfied.

16. The system of claim 15, wherein the instructions are further configured to cause the computer to receive information indicative of the one or more of the efficiency threshold or the uniformity threshold from a user.

17. The system of claim 13, wherein the phase-locking condition comprises a preset number of iterations of the steps (1)-(5).

18. The system of claim 17, wherein the preset number of iterations of the steps (1)-(5) is selected by a user.

19. The system of claim 17, wherein the preset number of iterations of the steps (1)-(5) comprises between 3-15 iterations.

20. The system of claim 13, wherein the target focal plane amplitude function comprises at least one or more of a uniform large optical focus array ("LOFA"), a hexagonal lattice LOFA, or a disordered LOFA.

21. The system of claim 13, wherein the back focal plane input amplitude function in the first step (1) is a Gaussian amplitude function.

22. The method of claim 13, wherein the instructions are further configured to cause the computer to (8) focus the phase-modulated light onto an image plane with at least one focusing lens.

23. The method of claim 22, wherein the instructions are further configured to cause the computer to (9) capture a spatially resoled image of the amplitude of the focused phase-modulated light.

24. The method of claim 23, wherein the instructions are further configured to cause the computer to:
(10) calculate the corrected focal plane amplitude function based on the spatially resolved image of the amplitude of the focused phase-modulated light and the target focal plane amplitude function;
(11) perform an inverse Fourier transform on the corrected focal plane amplitude function and the fixed focal plane phase function determined from the previous step (6) to produce the updated back focal plane phase function;
(12) perform a Fourier transform on the CGH back focal plane input amplitude function and the back focal plane updated phase function to produce the focal plane amplitude function and the focal plane phase function;
(13) repeating, at least once, the steps (7)-(12);
(14) after the step (13), modulating the phase of light from the light source with the phase SLM, wherein the modulating the phase of the light comprises locally shifting the phase of the light by the SLM by the amount that is approximately equal to the updated back focal plane phase function after the step (14).

25. A method comprising: performing a weighted Gerchberg-Saxton algorithm for a first number of iterations until a phase-locking condition is satisfied; performing the weighted Gerchberg-Saxton algorithm with a locked focal plane phase function for a second number of iterations; and controlling, after the second number of iterations, a phase spatial light modulator ("SLM") with a final back focal plane phase function from the phase-fixed weighted Gerchberg-Saxton algorithm.

26. The method of claim 25, further comprising: recording an image of the light produced by the SLM using the final back focal plane phase function from the phase-fixed weighted Gerchberg-Saxton algorithm; performing the phase-fixed weighted Gerchberg-Saxton algorithm for a third number of iterations using the recorded images of the light produced by the SLM using the back focal plane phase function from the phase-fixed weighted Gerchberg-Saxton algorithm in the second number of iterations; and controlling, after the third number of iterations, the phase spatial light modulator ("SLM") with a second final back focal plane phase function from the weighted Gerchberg-Saxton algorithm to form an optical focus array.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. A system comprising:
a computing node configured to:
 read a light source amplitude function, a target amplitude function, and a phase function;
 iteratively:
  perform a Fourier transform on the light source amplitude function and the phase function to produce a focal plane amplitude function and a focal plane phase function,
  calculate a corrected amplitude function based on the focal plane amplitude function and the target amplitude function, and
  perform an inverse Fourier transform on the corrected amplitude function and the focal plane phase function to update the phase function
 until a phase-locking condition is satisfied in a first iterative process;
 retain the focal plane phase function as a locked phase function; and
 iteratively:
  perform a Fourier transform on the light source amplitude function and the phase function to produce a focal plane amplitude function and a focal plane phase function,
  calculate a corrected amplitude function based on the focal plane amplitude function and the target amplitude function, and
  perform an inverse Fourier transform on the corrected amplitude function and the locked phase function to update the phase function
 until a first halting condition is satisfied in a second iterative process.

2. The system of claim 1, further comprising:
a phase spatial light modulator ("SLM");
a light source configured to illuminate the SLM, the light source conforming to the light source amplitude function, thereby generating a phase-modulated beam, the beam having an amplitude function and a phase function; and
at least one photodetector configured to detect an interference pattern generated by the beam at a focal plane, wherein the computing node is operatively coupled to the SLM and the photodetector, and is further configured to:
 configure the SLM according to the phase function, thereby controlling the phase function of the beam;
 determine from the photodetector an amplitude function of the interference pattern;
 update the target amplitude function based on the amplitude function of the interference pattern;
 iteratively:
  perform a Fourier transform on the amplitude function of the beam and the phase function of the beam to produce a focal plane amplitude function and a focal plane phase function,
  calculate a corrected amplitude function based on the focal plane amplitude function and the target amplitude function,
  perform an inverse Fourier transform on the corrected amplitude function and the locked phase function to update the phase function
 until a second halting condition is satisfied in a third iterative process; and
 configure the SLM according to the phase function, thereby controlling the phase function of the beam.

3. The system of claim 2, wherein the computing node is further configured to:
update the target amplitude function and repeat said third iterative process.

4. The system of claim 2, wherein the interference pattern generated by the beam at the focal plane forms a regular lattice of maxima.

5. The system of claim 2, wherein the interference pattern generated by the beam at the focal plane forms a disordered lattice of maxima.

6. The system of claim 2, further comprising at least one lens, the at least one lens configured to focus the beam onto the focal plane.

7. The system of claim 2, wherein the interference pattern generated by the beam at the focal plane comprises a plurality of foci, each having an amplitude, wherein updating the target amplitude function comprises computing a mean amplitude of the plurality of foci and comparing the amplitude of each of the plurality of foci to the mean amplitude.

8. The system of claim 1, wherein the phase-locking condition, the first halting condition, and/or the second halting condition comprises one or more of an efficiency threshold of the focal plane amplitude function or a uniformity threshold of the focal plane amplitude function.

9. The system of claim 1, wherein the computing node is further configured to:
calculate one or more of the efficiency of the focal plane amplitude function or the uniformity of the focal plane amplitude function; and
compare the efficiency of the focal plane amplitude function to the efficiency threshold and/or the uniformity of the focal plane amplitude to the uniformity threshold.

10. The system of claim 1, wherein the light source amplitude function is a two-dimensional Gaussian amplitude function.

11. The system of claim 1, wherein the light source amplitude function is detected by a photodetector.

12. A method comprising:
reading a light source amplitude function, a target amplitude function, and a phase function;
iteratively:
 performing a Fourier transform on the light source amplitude function and the phase function to produce a focal plane amplitude function and a focal plane phase function,
 calculating a corrected amplitude function based on the focal plane amplitude function and the target amplitude function, and
 performing an inverse Fourier transform on the corrected amplitude function and
 the focal plane phase function to update the phase function
until a phase-locking condition is satisfied in a first iterative process;
retaining the focal plane phase function as a locked phase function; and iteratively:
performing a Fourier transform on the light source amplitude function and the phase function to produce a focal plane amplitude function and a focal plane phase function,
calculating a corrected amplitude function based on the focal plane amplitude function and the target amplitude function, and
performing an inverse Fourier transform on the corrected amplitude function and the locked phase function to update the phase function
until a first halting condition is satisfied in a second iterative process.

13. The method of claim 12, further comprising:
illuminating a phase spatial light modulator ("SLM") with a light source, thereby generating a phase-modulated beam,
the light source conforming to the light source amplitude function,
the beam having an amplitude function and a phase function,
the beam being directed to a focal plane,
a photodetector being configured to detect an interference pattern generated by the beam at the focal plane;
configuring the SLM according to the phase function, thereby controlling the phase function of the beam;
determining from the photodetector an amplitude function of the interference pattern;
updating the target amplitude function based on the amplitude function of the interference pattern;
iteratively:
performing a Fourier transform on the amplitude function of the beam and the phase function of the beam to produce a focal plane amplitude function and a focal plane phase function,
calculating a corrected amplitude function based on the focal plane amplitude function and the target amplitude function,
performing an inverse Fourier transform on the corrected amplitude function and the locked phase function to update the phase function
until a second halting condition is satisfied in a third iterative process; and
configuring the SLM according to the phase function, thereby controlling the phase function of the beam.

14. The method of claim 13, wherein the interference pattern generated by the beam at the focal plane forms a regular lattice of maxima.

15. The method of claim 13, wherein the interference pattern generated by the beam at the focal plane forms a disordered lattice of maxima.

16. The method of claim 13, further comprising focusing the beam onto the focal plane with at least one lens.

17. The method of claim 13, wherein the interference pattern generated by the beam at the focal plane comprises a plurality of foci, each having an amplitude, wherein updating the target amplitude function comprises computing a mean amplitude of the plurality of foci and comparing the amplitude of each of the plurality of foci to the mean amplitude.

18. The method of claim 12, further comprising:
updating the target amplitude function and repeating the third iterative process.

19. The method of claim 12, wherein the phase-locking condition, the first halting condition, and/or the second halting condition comprises one or more of an efficiency threshold of the focal plane amplitude function or a uniformity threshold of the focal plane amplitude function.

20. The method of claim 12, further comprising:
calculating one or more of the efficiency of the focal plane amplitude function or the uniformity of the focal plane amplitude function; and
comparing the efficiency of the focal plane amplitude function to the efficiency threshold and/or the uniformity of the focal plane amplitude to the uniformity threshold.

21. The method of claim 12, wherein the light source amplitude function is a two-dimensional Gaussian amplitude function.

22. The method of claim 12, wherein the light source amplitude function is detected by a photodetector.

23. A computer program product for optical focus array generation, the computer program product comprising a computer readable storage medium having program instructions embodied therewith, the program instructions executable by a processor to cause the processor to perform a method comprising:
reading a light source amplitude function, a target amplitude function, and a phase function;
iteratively:
performing a Fourier transform on the light source amplitude function and the phase function to produce a focal plane amplitude function and a focal plane phase function,
calculating a corrected amplitude function based on the focal plane amplitude function and the target amplitude function,
performing an inverse Fourier transform on the corrected amplitude function and the focal plane phase function to update the phase function
until a phase-locking condition is satisfied in a first iterative process;
retaining the focal plane phase function as a locked phase function; and
iteratively:
performing a Fourier transform on the light source amplitude function and the phase function to produce a focal plane amplitude function and a focal plane phase function,
calculating a corrected amplitude function based on the focal plane amplitude function and the target amplitude function,
performing an inverse Fourier transform on the corrected amplitude function and the locked phase function to update the phase function
until a first halting condition is satisfied in a second iterative process.

24. The computer program product of claim 23, the method further comprising:
illuminating a phase spatial light modulator ("SLM") with a light source, thereby generating a phase-modulated beam,
the light source having a light source amplitude function,
the beam having an amplitude function and a phase function,
the beam being directed to a focal plane,
a photodetector being configured to detect an interference pattern generated by the beam at the focal plane;
configuring the SLM according to the phase function, thereby controlling the phase function of the beam;

determining from the photodetector an amplitude function of the interference pattern;
updating the target amplitude function based on the amplitude function of the interference pattern;
iteratively:
  performing a Fourier transform on the amplitude function of the beam and the phase function of the beam to produce a focal plane amplitude function and a focal plane phase function,
  calculating a corrected amplitude function based on the focal plane amplitude function and the target amplitude function,
  performing an inverse Fourier transform on the corrected amplitude function and the locked phase function to update the phase function
until a second halting condition is satisfied in a third iterative process; and
configuring the SLM according to the phase function, thereby controlling the phase function of the beam.

* * * * *